(12) United States Patent
Zhang et al.

(10) Patent No.: US 11,240,792 B2
(45) Date of Patent: Feb. 1, 2022

(54) MESSAGE TRANSMISSION METHOD AND APPARATUS, TERMINAL, AND BASE STATION

(71) Applicant: HUAWEI TECHNOLOGIES CO., LTD., Guangdong (CN)

(72) Inventors: Xingwei Zhang, Beijing (CN); Chao Li, Beijing (CN); Jie Shi, Shenzhen (CN); Zhe Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/665,772

(22) Filed: Oct. 28, 2019

(65) Prior Publication Data

US 2020/0120647 A1 Apr. 16, 2020

Related U.S. Application Data

(63) Continuation of application No. PCT/CN2018/085093, filed on Apr. 28, 2018.

(30) Foreign Application Priority Data

Apr. 28, 2017 (CN) .......................... 201710292759.5

(51) Int. Cl.
*H04W 72/04* (2009.01)
*H04W 8/24* (2009.01)
*H04W 72/12* (2009.01)

(52) U.S. Cl.
CPC .......... *H04W 72/042* (2013.01); *H04W 8/24* (2013.01); *H04W 72/0446* (2013.01); *H04W 72/1289* (2013.01)

(58) Field of Classification Search
CPC ........... H04W 72/0446; H04W 72/042; H04W 72/04; H04W 72/0413; H04W 72/1289;
(Continued)

(56) References Cited

U.S. PATENT DOCUMENTS

2010/0265910 A1 10/2010 Suo et al.
2012/0063413 A1 3/2012 Kroener et al.
(Continued)

FOREIGN PATENT DOCUMENTS

CN 101365187 A 2/2009
CN 101426268 A 5/2009
(Continued)

OTHER PUBLICATIONS

Vivo, "Support of intra-slot NR-PUCCH repetition," 3GPP TSG RAN WG1 88bis Meeting, R1-1704496; Spokane, Washington, USA, XP051242639, Apr. 3-7, 2017, 5 pages.
(Continued)

*Primary Examiner* — Kwasi Karikari

(74) *Attorney, Agent, or Firm* — Fish & Richardson P.C.

(57) ABSTRACT

Embodiments of this application disclose a message transmission method and apparatus, a terminal, and a base station. In the method, a symbol or symbol group may be used as a granularity to select a plurality of symbols or symbol groups from one or more slots and then allocate the plurality of symbols or symbol groups to a same terminal for transmitting data. The plurality of symbols or symbol groups may be used for uplink data scheduling or may be used for downlink data scheduling. Therefore, a slot resource is allocated at a small granularity, so that a time domain resource is more flexibly allocated, and the slot resource is more fully utilized. This helps improve message transmission efficiency, thereby expanding a coverage area.

19 Claims, 12 Drawing Sheets

(58) Field of Classification Search
CPC ............ H04W 72/0453; H04W 76/27; H04W 72/0406; H04W 72/14; H04W 74/006; H04W 72/0493; H04W 52/146; H04W 72/1273; H04W 74/004; H04W 28/26; H04L 5/0048; H04L 5/0051; H04L 5/0053; H04L 5/0023; H04L 5/0007; H04L 1/1887; H04L 1/1854; H04L 27/26025

See application file for complete search history.

(56) References Cited

U.S. PATENT DOCUMENTS

| | | | | |
|---|---|---|---|---|
| 2015/0358996 | A1* | 12/2015 | Fang | H04W 72/1278 370/280 |
| 2016/0278124 | A1* | 9/2016 | Zhao | H04W 56/004 |
| 2016/0295575 | A1* | 10/2016 | Dinan | H04L 5/0057 |
| 2017/0078830 | A1* | 3/2017 | Wu | H04W 4/70 |

FOREIGN PATENT DOCUMENTS

| | | |
|---|---|---|
| CN | 102223726 A | 10/2011 |
| CN | 103856310 A | 6/2014 |

OTHER PUBLICATIONS

Guangdong Oppo Mobiletelecom, "Slot aggregation and configuration for NR lang PUCCH," 3GPP TSG RAN WG1 meeting #88bis, R1-1704623; Spokane, Washington, USA, XP051242762, Apr. 3-7, 2017, 5 pages.

Extended European Search Report issued in European Application No. 18792188.7 dated Mar. 18, 2020, 9 pages.

Qualcomm et al. "WF on use of SS blocks in beam management", 3GPP TSG RAN WG1 NR, R1-1706733, Spokane, USA, Apr. 3-7, 2017, 2 pages.

3GPP TS 38.331 V0.0.2 (Mar. 2017), 3rd Generation Partnership Project, Technical Specification Group Radio Access Network, NR; Radio Resource Control (RRC), Protocol specification (Release 15), Mar. 2017, 13 pages.

PCT International Search Report and Written Opinion in International Application No. PCT/CN2018/085,093, dated Jul. 18, 2018, 14 pages (With English Translation).

Huawei, HiSilicon, "Long-duration PUCCH design," 3GPP TSG RAN WG1 Meeting #88bis, R1-1704208, Spokane, USA, Apr. 3-7, 2017, 4 pages.

Huawei, HiSilicon, "Scheduling scheme for slot aggregation," 3GPP TSG RAN WG1 Meeting # 88, R1-1701660, Athens, Greece, Feb. 13-17, 2017, 6 pages.

Motorola Mobility, "Flexible frame structure and control signalling for NR," 3GPP TSG RAN WG1 #87, R1-1612744, Reno, USA, Nov. 14-18, 2016, 3 pages.

Office Action issued in Chinese Application No. 201880019463.9 dated Apr. 2, 2021, 40 pages (with English translation).

CMCC, "Discussion on long duration uplink control channel design," 3GPP TSG RAN WG1 NR Ad-Hoc Meeting, R1-1700441, Spokane, USA, Jan. 16-20, 2017, 4 pages.

Office Action issued in Chinese Application No. 201880019463.9 dated Sep. 23, 2021, 13 pages.

* cited by examiner

Slot that includes only downlink symbols

Downlink-symbol-centric slot

Uplink-symbol-centric slot

Slot that includes only uplink symbols

| symb0 | symb0 | symb0 |
| | | symb1 |
| | symb1 | symb2 |
| | | symb3 |
| symb1 | symb2 | symb4 |
| | | symb5 |
| | symb3 | symb6 |
| | | symb7 |
| symb2 | symb4 | symb8 |
| | | symb9 |
| | symb5 | symb10 |
| | | symb11 |
| symb3 | symb6 | symb12 |
| | | symb13 |
| | symb7 | symb14 |
| | | symb15 |
| symb4 | symb8 | symb16 |
| | | symb17 |
| | symb9 | symb18 |
| | | symb19 |

FIG. 2

Downlink signal ▨

CONT. FROM FIG. 6A   Used for slot allocation

Interval ☐   Uplink signal ▨

US 11,240,792 B2

MESSAGE TRANSMISSION METHOD AND APPARATUS, TERMINAL, AND BASE STATION

CROSS-REFERENCE TO RELATED APPLICATIONS

This application is a continuation of International Application No. PCT/CN2018/085093, filed on Apr. 28, 2018, which claims priority to Chinese Patent Application No. 201710292759.5, filed on Apr. 28, 2017, The disclosures of the aforementioned applications are hereby incorporated by reference in their entireties.

TECHNICAL FIELD

This application relates to the communication field, and in particular, to a message transmission method and apparatus, a terminal, and a base station.

BACKGROUND

A time division multiplexing system divides system time into a plurality of parts for use by users, and each part is one slot. In a 5th generation (5G) new radio access technology (NR), one slot may include at least one of a downlink symbol (DL symbol), a guard period (GP), or an uplink symbol (UL symbol). In this way, slot composition includes at least the following types: a slot that includes only downlink symbols (DL only slot), a downlink-symbol-centric slot (DL centric slot), an uplink-symbol-centric slot (UL centric slot), and a slot that includes only uplink symbols (UL only slot), as shown in FIG. 1.

The slot may alternatively be a combination, in another form, of a downlink symbol, a guard period symbol, and an uplink symbol, and different slot compositions may include different quantities of uplink symbols, different quantities of downlink symbols, and different quantities of guard period symbols. There may be different slot types, and different slot types include different quantities of symbols. For example, a mini slot includes fewer than seven symbols (for example, one symbol, two symbols, or four symbols), and a normal slot includes seven symbols or 14 symbols. In FIG. 1, a seven-symbol normal slot is used as an example.

A time domain resource in a 5G NR system may be divided into a plurality of 10-ms radio frames in time domain, one radio frame includes 10 1-ms subframes, one subframe has one or more slots, and one slot has one or more symbols. In the 5G NR, a plurality of types of subcarrier spacings are introduced, and correspondingly, there are a plurality of types of symbol lengths and subframe lengths, as shown in FIG. 2. A base station (for example, evolved NodeB, eNB) needs to pertinently allocate different time domain resources to terminals based on different message transmission requirements of the terminals.

The 5G NR usually works in a high-frequency scenario. A high frequency resource has a high frequency and a short wavelength (for example, a millimeter wave). Therefore, signal fading is severe, and a coverage area is small. There is a problem that needs to be solved in 5G NR message transmission: how to better complete message transmission in a case of complex time domain resource composition and types, for example, in a case of composition of various slots such as a mini slot and a common slot, to ensure a coverage area.

SUMMARY

This application provides a message transmission method and apparatus, a terminal, and a base station, to reduce downlink control signaling overheads while expanding a coverage area.

According to a first aspect, this application provides a message transmission method. The method is applied to a terminal side, and the method includes: receiving control signaling from a base station, where the control signaling includes information about a plurality of time domain resources used to transmit a message; determining, based on the control signaling, the plurality of time domain resources used to transmit the message, where the time domain resources are symbols or symbol groups, where the symbols or symbol groups are from one slot; or the symbols or symbol groups are from a plurality of consecutive slots, and the plurality of consecutive slots differ in composition and/or type; or the symbols or symbol groups are from a plurality of inconsecutive slots; and transmitting the message in the time domain resources. In this implementation, slot aggregation can be implemented in a granularity of symbols or symbol groups, so that a time domain resource is more flexibly allocated, and a slot resource is more fully utilized. This helps improve message transmission efficiency, thereby expanding a coverage area.

With reference to the first aspect, in a first possible implementation of the first aspect, the message is signaling or data.

With reference to the first aspect, in a second possible implementation of the first aspect, the slots are from one or more subframes. The slots may be from a plurality of subframes. If a small quantity of symbols are selected, the symbols may be from one or several slots, and the one slot or several slots may belong to a same subframe.

With reference to the first aspect, in a third possible implementation of the first aspect, the time domain resources are symbols or symbol groups, the symbols or symbol groups are from a plurality of consecutive slots; quantities of symbols or symbol groups determined from all the slots are the same; or messages transmitted in the symbols or symbol groups determined from all the slots have same content, and quantities of symbols or symbol groups determined from the slots are different. In this way, slot aggregation can be implemented in a granularity of symbols or symbol groups. When different quantities of symbols are selected from all the slots, messages transmitted in the selected symbols have same content. This helps a transmit party perform average segmentation based on a quantity of slots during data segmentation, and also helps a receive party combine data, to avoid a confusion in amounts of data allocated to the symbols in a message transmission process.

With reference to the third possible implementation of the first aspect, in a fourth possible implementation of the first aspect, quantities of symbols or symbol groups determined from all the slots are the same, and the symbols or symbol groups are at a same absolute location or relative location in the slots in which the symbols or symbol groups are located. The same absolute location helps reserve symbols at a fixed location, for example, reserve the last symbols in the slots, to help a short physical uplink control channel (Short PUCCH) occupy the last symbols in the slots, thereby improving transmission efficiency. The same relative location helps transmit a long physical uplink control channel (Long PUCCH) in the plurality of slots. After aggregation is performed for the Long PUCCH, end symbols in the slots may be used to independently transmit a Short PUCCH, thereby improving slot resource utilization.

With reference to the first aspect, in a fifth possible implementation of the first aspect, the time domain resources are symbols or symbol groups; the symbols or symbol groups are from a plurality of inconsecutive slots, and the slots are of same composition or a same type, or the slots have a same quantity of uplink symbols or downlink symbols; and quantities of symbols or symbol groups determined from all the slots are the same; or messages transmitted in the symbols or symbol groups determined from all the slots have same content, and quantities of symbols or symbol groups determined from the slots are different. In this way, slot aggregation can be implemented in a granularity of symbols or symbol groups. Because the slots are inconsecutive, time domain resource allocation complexity can be reduced in this implementation.

With reference to any one of the first aspect, or the first to the fifth possible implementations of the first aspect, in a sixth possible implementation of the first aspect, the transmitting the message in the time domain resources is specifically: if the message belongs to one transport block, transmitting the transport block in the time domain resources; or if the message belongs to M transport blocks, transmitting each transport block in one time domain resource, where M is a quantity of the time domain resources, and M>1. In this implementation, transmission efficiency is higher.

With reference to any one of the first aspect, or the first to the fifth possible implementations of the first aspect, in a seventh possible implementation of the first aspect, the transmitting the message in the time domain resources specifically includes: transmitting the message in each time domain resource, where the message is repeatedly transmitted for M times, and M is a quantity of time domain resources. In this implementation, message transmission reliability and accuracy can be improved.

With reference to any one of the first aspect, or the first to the fifth possible implementations of the first aspect, in an eighth possible implementation of the first aspect, the transmitting the message in the time domain resources specifically includes: determining, based on a priority or a latency of the message, the time domain resources for transmitting the message; and transmitting the message in the time domain resources. This implementation can ensure that a message with a high priority or a short latency is first transmitted, thereby ensuring message integrity.

With reference to the first aspect, in a ninth possible implementation of the first aspect, the receiving control signaling from a base station specifically includes: receiving one piece of control signaling from the base station, where the one piece of control signaling includes the information about the plurality of time domain resources used to transmit the message; or receiving a plurality of pieces of control signaling from the base station, where each of the plurality of pieces of control signaling includes information about one time domain resource used to transmit the message.

With reference to the first aspect or the ninth possible implementation of the first aspect, in a tenth possible implementation of the first aspect, the control signaling further includes at least one type of the following information: a plurality of frequency domain resources used to transmit the message, slot composition or slot types of the time domain resources, time division duplex TDD configurations of the time domain resources, a transmission format of the message, a modulation scheme and/or a coding format of the message, power control information of the message, a hybrid automatic repeat request HARQ process number of the message, a reference signal of the message, antenna information of the message, beam information of the message, station information of the message, or a redundancy version of the message.

With reference to the tenth possible implementation of the first aspect, in an eleventh possible implementation of the first aspect, messages transmitted in different time domain resources differ in at least one type of the corresponding information. Messages transmitted in different time domain resources may differ in one type of the corresponding information, or may differ in a plurality of types of the corresponding information. In this way, a time domain resource can be more flexibly configured. For example, in a case of strong fading, modulation may be performed by using different configurations of a modulation scheme.

With reference to the first aspect, in a twelfth possible implementation of the first aspect, the method further includes: reporting, to the base station, a capability of transmitting a message in a plurality of time domain resources, so that the base station can predetermine whether to allocate the time domain resources, to avoid an unnecessary time domain resource allocation process; and/or receiving, from the base station, signaling for enabling or disabling transmission of a message in a plurality of time domain resources, so that message transmission of the terminal can be flexibly controlled, to reduce time domain resource allocation consumption and avoid a transmission error.

According to a second aspect, this application provides a message transmission method. The method is applied to a base station side, and the method includes: determining a plurality of time domain resources to be allocated to a terminal, where the time domain resources are used to transmit a message, and the time domain resources are symbols or symbol groups, where the symbols or symbol groups are from one slot; or the symbols or symbol groups are from a plurality of consecutive slots, and the plurality of consecutive slots differ in composition and/or type; or the symbols or symbol groups are from a plurality of inconsecutive slots; sending control signaling to the terminal, where the control signaling includes information about the time domain resources; and receiving the message transmitted by the terminal in the time domain resources.

With reference to the second aspect, in a first possible implementation of the second aspect, the message is signaling or data.

With reference to the second aspect, in a second possible implementation of the second aspect, the slots are from one or more subframes.

With reference to the second aspect, in a third possible implementation of the second aspect, the time domain resources are symbols or symbol groups, the symbols or symbol groups are from a plurality of consecutive slots, and quantities of symbols or symbol groups determined from all the slots are the same; or messages transmitted in the symbols or symbol groups determined from all the slots have same content, and quantities of symbols or symbol groups determined from the slots are different.

With reference to the third possible implementation of the second aspect, in a fourth possible implementation of the second aspect, quantities of symbols or symbol groups determined from all the slots are the same, and the symbols or symbol groups are at a same absolute location or relative location in the slots in which the symbols or symbol groups are located.

With reference to the second aspect, in a fifth possible implementation of the second aspect, the time domain resources are symbols or symbol groups, the symbols or symbol groups are from a plurality of inconsecutive slots, and the slots are of same composition or a same type, or the slots have a same quantity of uplink symbols or downlink symbols; and quantities of symbols or symbol groups determined from all the slots are the same; or messages transmitted in the symbols or symbol groups determined from all the slots have same content, and quantities of symbols or symbol groups determined from the slots are different.

With reference to the second aspect, in a sixth possible implementation of the second aspect, there is one piece of control signaling, including the information about the plurality of time domain resources; or there are a plurality of pieces of control signaling, and each piece of control signaling includes information about one time domain resource.

With reference to the second aspect or the sixth possible implementation of the second aspect, in a seventh possible implementation of the second aspect, the control signaling further includes at least one type of the following information: a plurality of frequency domain resources used to transmit the message; slot composition or slot types of the time domain resources; TDD configurations of the time domain resources; a transmission format of the message; a modulation scheme and/or a coding format of the message; power control information of the message; a HARQ process number of the message; a reference signal of the message; antenna information of the message; beam information of the message; station information of the message; or a redundancy version of the message.

With reference to the seventh possible implementation of the second aspect, in an eighth possible implementation of the second aspect, messages transmitted in different time domain resources differ in at least one type of the corresponding information.

With reference to the second aspect, in a ninth possible implementation of the second aspect, the method further includes: receiving a capability that is of transmitting a message in a plurality of time domain resources and that is reported by the terminal; and/or sending, to the terminal, signaling for enabling or disabling transmission of a message in a plurality of time domain resources.

According to a third aspect, this application provides a message transmission apparatus. The apparatus is applied to a terminal side and includes: a receiving unit, configured to receive control signaling from a base station, where the control signaling includes information about a plurality of time domain resources used to transmit a message; a time domain resource determining unit, configured to determine, based on the control signaling, the plurality of time domain resources used to transmit the message, where the time domain resources are symbols or symbol groups, where the symbols or symbol groups are from one slot; or the symbols or symbol groups are from a plurality of consecutive slots, and the plurality of consecutive slots differ in composition and/or type; or the symbols or symbol groups are from a plurality of inconsecutive slots; and a transmission unit, configured to transmit the message in the time domain resources.

With reference to the third aspect, in a first possible implementation of the third aspect, the message is signaling or data.

With reference to the third aspect, in a second possible implementation of the third aspect, the slots are from one or more subframes.

With reference to the third aspect, in a third possible implementation of the third aspect, the time domain resources are symbols or symbol groups, the symbols or symbol groups are from a plurality of consecutive slots, and quantities of symbols or symbol groups determined from all the slots are the same; or messages transmitted in the symbols or symbol groups determined from all the slots have same content, and quantities of symbols or symbol groups determined from the slots are different.

With reference to the third possible implementation of the third aspect, in a fourth possible implementation of the third aspect, quantities of symbols or symbol groups determined from all the slots are the same, and the symbols or symbol groups are at a same absolute location or relative location in the slots in which the symbols or symbol groups are located.

With reference to the third aspect, in a fifth possible implementation of the third aspect, the time domain resources are symbols or symbol groups, the symbols or symbol groups are from a plurality of inconsecutive slots, and the slots are of same composition or a same type, or the slots have a same quantity of uplink symbols or downlink symbols, and quantities of symbols or symbol groups determined from all the slots are different; or messages transmitted in the symbols or symbol groups determined from all the slots have same content, and quantities of symbols or symbol groups determined from the slots are different.

With reference to any one of the third aspect, or the first to the fifth possible implementations of the third aspect, in a sixth possible implementation of the third aspect, the transmission unit is specifically configured to: if the message belongs to one transport block, transmit the transport block in the time domain resources; or if the message belongs to M transport blocks, transmit each transport block in one time domain resource, where M is a quantity of time domain resources, and M>1.

With reference to any one of the third aspect, or the first to the fifth possible implementations of the third aspect, in a seventh possible implementation of the third aspect, the transmission unit is specifically configured to transmit the message in each time domain resource, where the message is repeatedly transmitted for M times, and M is a quantity of time domain resources.

With reference to any one of the third aspect, or the first to the fifth possible implementations of the third aspect, in an eighth possible implementation of the third aspect, the transmission unit is specifically configured to: determine, based on a priority or a latency of the message, the time domain resources for transmitting the message; and transmit the message in the time domain resources.

With reference to the third aspect, in a ninth possible implementation of the third aspect, the receiving unit is specifically configured to: receive one piece of control signaling from the base station, where the one piece of control signaling includes the information about the plurality of time domain resources used to transmit the message; or receive a plurality of pieces of control signaling from the base station, where each of the plurality of pieces of control signaling includes information about one time domain resource used to transmit the message.

With reference to the third aspect or the ninth possible implementation of the third aspect, in a tenth possible implementation of the third aspect, the control signaling further includes at least one type of the following information: a plurality of frequency domain resources used to transmit the message; slot composition or slot types of the time domain resources; TDD configurations of the time domain resources; a transmission format of the message; a modulation scheme and/or a coding format of the message; power control information of the message; a HARQ process number of the message; a reference signal of the message; antenna information of the message; beam information of the message; station information of the message; or a redundancy version of the message.

With reference to the tenth possible implementation of the third aspect, in an eleventh possible implementation of the third aspect, messages transmitted in different time domain resources differ in at least one type of the corresponding information.

With reference to the third aspect, in a twelfth possible implementation of the third aspect, the receiving unit is further configured to receive, from the base station, signaling for enabling or disabling transmission of a message in a plurality of time domain resources; and/or the apparatus further includes a reporting unit, where the reporting unit is configured to report, to the base station, a capability of transmitting a message in a plurality of time domain resources.

According to a fourth aspect, this application provides a message transmission apparatus. The apparatus is applied to a base station side, and the apparatus includes: a resource allocation unit, configured to determine a plurality of time domain resources to be allocated to a terminal, where the time domain resources are used to transmit a message, and the time domain resources are symbols or symbol groups, where the symbols or symbol groups are from one slot; or the symbols or symbol groups are from a plurality of consecutive slots, and the plurality of consecutive slots differ in composition and/or type; or the symbols or symbol groups are from a plurality of inconsecutive slots; a sending unit, configured to send control signaling to the terminal, where the control signaling includes information about the time domain resources; and a receiving unit, configured to receive the message transmitted by the terminal in the time domain resources.

With reference to the fourth aspect, in a first possible implementation of the fourth aspect, the message is signaling or data.

With reference to the fourth aspect, in a second possible implementation of the fourth aspect, the slots are from one or more subframes.

With reference to the fourth aspect, in a third possible implementation of the fourth aspect, the time domain resources are symbols or symbol groups, the symbols or symbol groups are from a plurality of consecutive slots, and quantities of symbols or symbol groups determined from all the slots are the same; or messages transmitted in the symbols or symbol groups determined from all the slots have same content, and quantities of symbols or symbol groups determined from the slots are different.

With reference to the third possible implementation of the fourth aspect, in a fourth possible implementation of the fourth aspect, quantities of symbols or symbol groups determined from all the slots are the same, and the symbols or symbol groups are at a same absolute location or relative location in the slots in which the symbols or symbol groups are located.

With reference to the fourth aspect, in a fifth possible implementation of the fourth aspect, the time domain resources are symbols or symbol groups, the symbols or symbol groups are from a plurality of inconsecutive slots, and the slots are of same composition or a same type, or the slots have a same quantity of uplink symbols or downlink symbols, and quantities of symbols or symbol groups determined from all the slots are the same; or messages transmitted in the symbols or symbol groups determined from all the slots have same content, and quantities of symbols or symbol groups determined from the slots are different.

With reference to the fourth aspect, in a sixth possible implementation of the fourth aspect, there is one piece of control signaling, including the information about the plurality of time domain resources; or there are a plurality of pieces of control signaling, and each piece of control signaling includes information about one time domain resource.

With reference to the fourth aspect or the sixth possible implementation of the fourth aspect, in a seventh possible implementation of the fourth aspect, the control signaling further includes at least one type of the following information: a plurality of frequency domain resources used to transmit the message; slot composition or slot types of the time domain resources; TDD configurations of the time domain resources; a transmission format of the message; a modulation scheme and/or a coding format of the message; power control information of the message; a HARQ process number of the message; a reference signal of the message; antenna information of the message; beam information of the message; station information of the message; or a redundancy version of the message.

With reference to the seventh possible implementation of the fourth aspect, in an eighth possible implementation of the fourth aspect, messages transmitted in different time domain resources differ in at least one type of the corresponding information.

With reference to the fourth aspect, in a ninth possible implementation of the fourth aspect, the receiving unit is further configured to receive a capability that is of transmitting a message in a plurality of time domain resources and that is reported by the terminal; and/or the sending unit is further configured to send, to the terminal, signaling for enabling or disabling transmission of a message in a plurality of time domain resources.

According to a fifth aspect, this application provides a terminal. The terminal includes: a transmitter, configured to receive control signaling from a base station, where the control signaling includes information about a plurality of time domain resources used to transmit a message; and a processor, configured to determine, based on the control signaling, the plurality of time domain resources used to transmit the message, where the time domain resources are symbols or symbol groups, where the symbols or symbol groups are from one slot; or the symbols or symbol groups are from a plurality of consecutive slots, and the plurality of consecutive slots differ in composition and/or type; or the symbols or symbol groups are from a plurality of inconsecutive slots, where the transmitter is further configured to transmit the message in the time domain resources.

With reference to the fifth aspect, in a first possible implementation of the fifth aspect, the message is signaling or data.

With reference to the fifth aspect, in a second possible implementation of the fifth aspect, the slots are from one or more subframes.

With reference to the fifth aspect, in a third possible implementation of the fifth aspect, the time domain resources are symbols or symbol groups, the symbols or symbol groups are from a plurality of consecutive slots, and quantities of symbols or symbol groups determined from all the slots are the same; or messages transmitted in the symbols or symbol groups determined from all the slots have same content, and quantities of symbols or symbol groups determined from the slots are different.

With reference to the third possible implementation of the fifth aspect, in a fourth possible implementation of the fifth aspect, quantities of symbols or symbol groups determined from all the slots are the same, and the symbols or symbol groups are at a same absolute location or relative location in the slots in which the symbols or symbol groups are located.

With reference to the fifth aspect, in a fifth possible implementation of the fifth aspect, the time domain resources are symbols or symbol groups, the symbols or symbol groups are from a plurality of inconsecutive slots, and the slots are of same composition or a same type, or the slots have a same quantity of uplink symbols or downlink symbols, and quantities of symbols or symbol groups determined from all the slots are the same; or messages transmitted in the symbols or symbol groups determined from all the slots have same content, and quantities of symbols or symbol groups determined from the slots are different.

With reference to any one of the fifth aspect, or the first to the fifth possible implementations of the fifth aspect, in a sixth possible implementation of the fifth aspect, the transmitter is specifically configured to: if the message belongs to one transport block, transmit the transport block in the time domain resources; or if the message belongs to M transport blocks, transmit each transport block in one time domain resource, where M is a quantity of time domain resources, and M>1.

With reference to any one of the fifth aspect, or the first to the fifth possible implementations of the fifth aspect, in a seventh possible implementation of the fifth aspect, the transmitter is specifically configured to transmit the message in each time domain resource, where the message is repeatedly transmitted for M times, and M is a quantity of time domain resources.

With reference to any one of the fifth aspect, or the first to the fifth possible implementations of the fifth aspect, in an eighth possible implementation of the fifth aspect, the transmitter is specifically configured to: determine, based on a priority or a latency of the message, the time domain resources for transmitting the message; and transmit the message in the time domain resources.

With reference to the fifth aspect, in a ninth possible implementation of the fifth aspect, the transmitter is specifically configured to: receive one piece of control signaling from the base station, where the one piece of control signaling includes the information about the plurality of time domain resources used to transmit the message; or receive a plurality of pieces of control signaling from the base station, where each of the plurality of pieces of control signaling includes information about one time domain resource used to transmit the message.

With reference to the fifth aspect or the ninth possible implementation of the fifth aspect, in a tenth possible implementation of the fifth aspect, the control signaling further includes at least one type of the following information: a plurality of frequency domain resources used to transmit the message; slot composition or slot types of the time domain resources; TDD configurations of the time domain resources; a transmission format of the message; a modulation scheme and/or a coding format of the message; power control information of the message; a HARQ process number of the message; a reference signal of the message; antenna information of the message; beam information of the message; station information of the message; or a redundancy version of the message.

With reference to the tenth possible implementation of the fifth aspect, in an eleventh possible implementation of the fifth aspect, messages transmitted in different time domain resources differ in at least one type of the corresponding information.

With reference to the fifth aspect, in a twelfth possible implementation of the fifth aspect, the transmitter is further configured to receive, from the base station, signaling for enabling or disabling transmission of a message in a plurality of time domain resources; and/or is further configured to report, to the base station, a capability of transmitting a message in a plurality of time domain resources.

According to a sixth aspect, this application provides a base station. The base station includes: a processor, configured to determine a plurality of time domain resources to be allocated to a terminal, where the time domain resources are used to transmit a message, and the time domain resources are symbols or symbol groups, where the symbols or symbol groups are from one slot; or the symbols or symbol groups are from a plurality of consecutive slots, and the plurality of consecutive slots differ in composition and/or type; or the symbols or symbol groups are from a plurality of inconsecutive slots; a sender, configured to send control signaling to the terminal, where the control signaling includes information about the time domain resources; and a receiver, configured to receive the message transmitted by the terminal in the time domain resources.

With reference to the sixth aspect, in a first possible implementation of the sixth aspect, the message is signaling or data.

With reference to the sixth aspect, in a second possible implementation of the sixth aspect, the slots are from one or more subframes.

With reference to the sixth aspect, in a third possible implementation of the sixth aspect, the time domain resources are symbols or symbol groups, the symbols or symbol groups are from a plurality of consecutive slots, and quantities of symbols or symbol groups determined from all the slots are the same; or messages transmitted in the symbols or symbol groups determined from all the slots have same content, and quantities of symbols or symbol groups determined from the slots are different.

With reference to the third possible implementation of the sixth aspect, in a fourth possible implementation of the sixth aspect, uantities of symbols or symbol groups determined from all the slots are the same, and the symbols or symbol groups are at a same absolute location or relative location in the slots in which the symbols or symbol groups are located.

With reference to the sixth aspect, in a fifth possible implementation of the sixth aspect, the time domain resources are symbols or symbol groups, the symbols or symbol groups are from a plurality of inconsecutive slots, and the slots are of same composition or a same type, or the slots have a same quantity of uplink symbols or downlink symbols, and quantities of symbols or symbol groups determined from all the slots are different; or messages transmitted in the symbols or symbol groups determined from all the slots have same content, and quantities of symbols or symbol groups determined from the slots are different.

With reference to the sixth aspect, in a sixth possible implementation of the sixth aspect, there is one piece of control signaling, including the information about the plurality of time domain resources; or there are a plurality of pieces of control signaling, and each piece of control signaling includes information about one time domain resource.

With reference to the sixth aspect or the sixth possible implementation of the sixth aspect, in a seventh possible implementation of the sixth aspect, the control signaling further includes at least one type of the following information: a plurality of frequency domain resources used to transmit the message; slot composition or slot types of the time domain resources; TDD configurations of the time domain resources; a transmission format of the message; a modulation scheme and/or a coding format of the message; power control information of the message; a HARQ process number of the message; a reference signal of the message; antenna information of the message; beam information of the message; station information of the message; or a redundancy version of the message.

With reference to the seventh possible implementation of the sixth aspect, in an eighth possible implementation of the sixth aspect, messages transmitted in different time domain resources differ in at least one type of the corresponding information.

With reference to the sixth aspect, in a ninth possible implementation of the sixth aspect, the receiver is further configured to receive a capability that is of transmitting a message in a plurality of time domain resources and that is reported by the terminal; and/or the sender is further configured to send, to the terminal, signaling for enabling or disabling transmission of a message in a plurality of time domain resources.

With reference to the sixth aspect, in a tenth possible implementation of the sixth aspect, the sender is further configured to transmit a downlink message to the terminal. According to the technical solutions provided in the embodiments of this application, the symbol or symbol group may be used as a granularity to select a plurality of symbols or symbol groups from one or more slots and then allocate the plurality of symbols or symbol groups to a same terminal for transmitting data, to implement slot aggregation and complete uplink data scheduling or downlink data scheduling. The slot aggregation may implement slot resource allocation at a small granularity, so that a time domain resource is more flexibly allocated, and a slot resource is more fully utilized, to avoid a waste of slot resources. This helps improve message transmission efficiency and reduce downlink control signaling overheads, thereby expanding a coverage area.

DESCRIPTION OF DRAWINGS

FIG. 2 is an example diagram of symbols and subframes;

DESCRIPTION OF EMBODIMENTS

Various aspects are described with reference to a terminal and a base station in this application. The terminal is a device that provides a user with voice and/or data connectivity, and may be a handheld device with a wireless connection function, or another processing device connected to a wireless modem, or a mobile terminal that communicates with one or more core networks by using a radio access network. For example, the terminal may be a mobile phone (or referred to as a "cellular" phone) or a computer with a mobile terminal. For another example, the terminal may be a portable, pocket-sized, handheld, computer built-in, or in-vehicle mobile apparatus. For still another example, the terminal may be a part of a mobile station, an access point, or user equipment.

A terminal sending a message to the base station is uplink transmission, and a terminal receiving a message sent by the base station is downlink transmission. Before performing uplink transmission, the terminal sends a scheduling request and/or a buffer status report to the base station, where the scheduling request and/or the buffer status report include/includes information such as a data amount and content of a to-be-sent message. The base station allocates a time domain resource to the terminal based on the scheduling request of the terminal, where the time domain resource is used to transmit the uplink message. After obtaining a downlink service requirement of the terminal by using a core network, for example, after obtaining a download requirement (including a download data amount, content, and the like) of the terminal by using the core network, the base station allocates a time domain resource to the terminal based on the downlink service requirement of the terminal, where the time domain resource is used to transmit a downlink message. The message may be data, or may be signaling, including control signaling, for example, uplink control signaling UCI. After allocating the time domain resource, the base station sends control signaling to the terminal. The terminal determines, by using the control signaling, of the time domain resource allocated to the terminal, and then performs uplink transmission, in other words, transmits an uplink message, or perform downlink transmission, in other words, transmits a downlink message, in the time domain resource.

Figure 1:
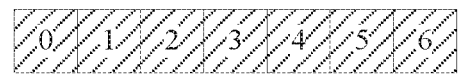
FIG. 1 is an example diagram of slot composition.
Figure 1:
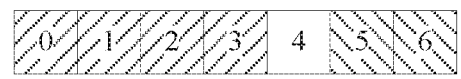
Figure 1:
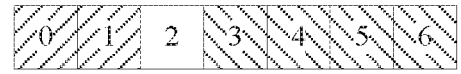
Figure 1:
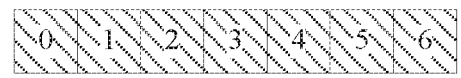
Figure 3:
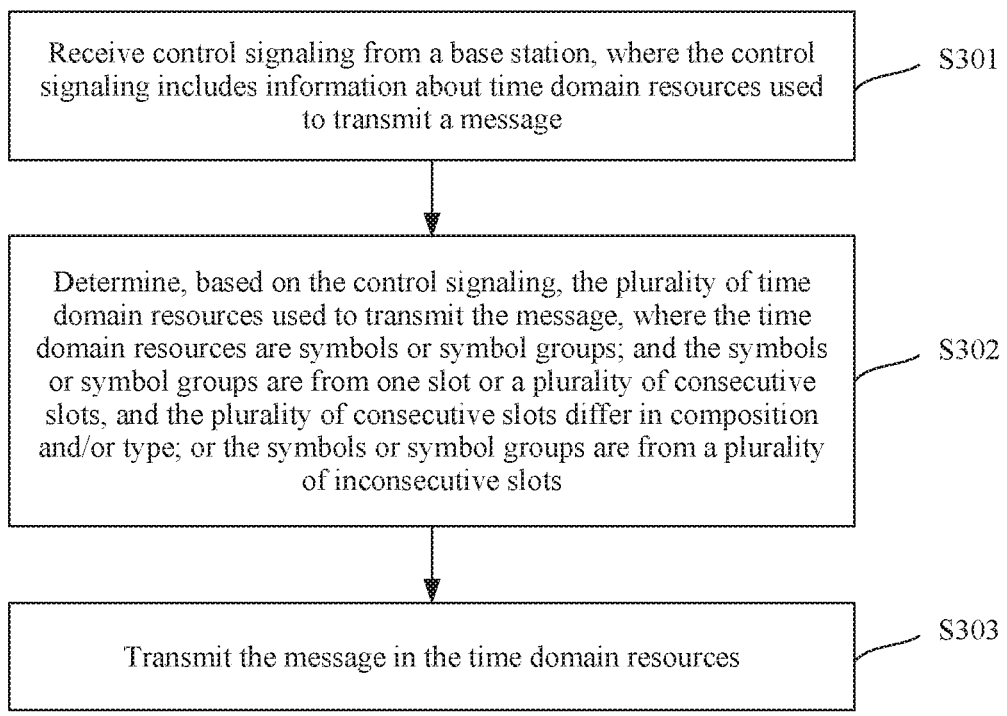
FIG. 3 is a schematic flowchart of an embodiment of a message transmission method applied to a terminal according to this application.

Specifically, FIG. 3 is a schematic flowchart of an embodiment of a message transmission method according to the embodiments of this application. The method is applied to a terminal. The method includes the following steps.

Step S301: Receive control signaling from a base station, where the control signaling includes information about a plurality of time domain resources used to transmit a message.

Step S302: Determine, based on the control signaling, the plurality of time domain resources used to transmit the message, where the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots.

After receiving a scheduling request of the terminal or obtaining a downlink service requirement of the terminal via a core network, the base station allocates the time domain resources to the terminal. The time domain resources include four granularities: a symbol, a symbol group, a slot, and a subframe. The symbol is an uplink symbol or a downlink symbol. The uplink symbol is used when uplink transmission is performed, and the downlink symbol is used when downlink transmission is performed. The slot includes symbols. The symbol group is a combination of a preset quantity of consecutive symbols in a slot. The subframe is composed by a slot. Actually, the message is transmitted in symbols regardless of whether a slot resource allocation granularity is a symbol, a symbol group, a slot, or a subframe.

In the prior art, time domain resource allocation granularities are mainly a slot and a subframe. In this embodiment of this application, in addition to a slot and a subframe, a symbol and a symbol group are further introduced, to implement slot aggregation. The slot aggregation means that some symbols in slots are selected as an independent time domain resource for use, to fully utilize a time domain resource, more economically and quickly transmit a message, and expand a coverage area of a high-frequency signal. When the transmitted message has a large data amount, symbols in slots may be fully utilized through slot aggregation, to avoid a waste of symbols and improve transmission efficiency. When the transmitted message has a small data amount, the message can be transmitted by using a symbol or symbol group, without using a complete slot or subframe, to avoid an unnecessary waste of time domain resources and improve a transmission speed.

The base station determines, based on a condition such as a data amount of an uplink message or a downlink message of the terminal, the time domain resources to be allocated to the terminal. A case in which the slot and the subframe are used as granularities for allocation is described in the prior art, and details are not described again. This embodiment of this application mainly describes a case in which the time domain resources are symbols or symbol groups.

In an implementation, the symbol is used as a granularity. The symbols are from one slot, or the symbols are from a plurality of consecutive slots. A specific quantity of slots is determined by the base station based on a condition such as the data amount of the uplink message or the downlink message by using a scheduling algorithm. When the symbols are from a plurality of consecutive slots, the plurality of consecutive slots differ in composition, for example, the plurality of consecutive slots have different quantities of uplink symbols or downlink symbols, or some slots include only uplink symbols and some slots include only downlink symbols; or the plurality of consecutive slots differ in type, for example, some slots are mini slots and some slots are normal slots, or some slots are two-symbol slots that include only uplink symbols and some slots are seven-symbol slots that include only uplink symbols; or the plurality of consecutive slots differ in both composition and type, for example, some slots are seven-symbol slots each having three uplink symbols, and some slots are 14-symbol slots each having five uplink symbols.

If the terminal performs uplink transmission, the base station selects a same quantity of uplink symbols from all the slots; or if the terminal performs downlink transmission, the base station selects a same quantity of downlink symbols from all the slots; and the base station allocates selected uplink symbols or downlink symbols to the terminal. Remaining uplink symbols or downlink symbols in the selected slots are not used for slot aggregation, and may be allocated to another UE or used for another purpose. The plurality of consecutive slots is selected by the base station from to-be-used slots based on the data amount of the message. Specifically, the base station may select M consecutive slots from N slots, wherein M can be determined according to minimum time domain resources that can satisfy a message transmission requirement, and N may be determined based on time domain resources that can be used for allocation by the base station, or N is a quantity of slots in a fixed radio frame long periodicity.

Figure 4A:
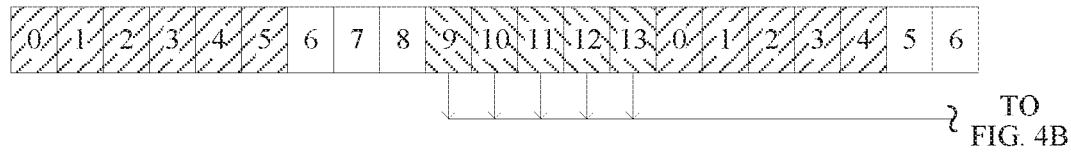
FIG. 4A and FIG. 4B are example diagrams of an implementation of slot aggregation according to this application.
Figure 4B:
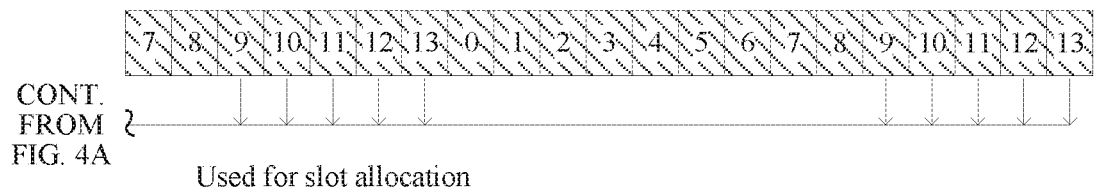

A quantity of symbols selected from the slots is also determined based on the data amount of the message, and the quantity is less than or equal to a minimum quantity of uplink symbols or downlink symbols in the plurality of consecutive slots. For example, the terminal performs uplink transmission, and the base station selects a same quantity of uplink symbols from all consecutive slots. As shown in FIG. 4, one slot is composed by 14 symbols, and all slots differ in composition. For example, the 1st slot has six downlink symbols, three guard period symbols, and five uplink symbols, the 2nd slot has five downlink symbols, two guard period symbols, and seven uplink symbols, and the 3rd slot is a slot that includes only uplink symbols. Five uplink symbols are selected from each slot, and 15 selected uplink symbols are determined as the time domain resources to be allocated to the terminal.

In this implementation, if uplink symbols or downlink symbols in the slots all start from a fixed location, the symbols selected from all the slots may be at a same absolute location in the slots. For example, if uplink symbols in slots each with a length of 14 all start from the 9th symbol, the selected uplink symbols all are the 9th to the 11th symbols in the slots. This case helps reserve symbols at a fixed location, for example, reserve the last symbols in the slots, to help a short physical uplink control channel (Short PUCCH) occupy the last symbols in the slots, thereby improving transmission efficiency. Alternatively, the symbols selected from all the slots are at a same relative location in the slots. For example, a same quantity of symbols are selected from all the slots, starting from the first uplink symbol. This helps transmit a long physical uplink control channel (Long PUCCH) in the plurality of slots. After aggregation is performed for the Long PUCCH, end symbols in the slots may be used to independently transmit a Short PUCCH, thereby improving slot resource utilization. Certainly, the symbols selected from the slots may be at different absolute locations or relative locations, but this is disadvantageous to transmission of the Short PUCCH.

In another implementation, the symbol is used as a granularity. The symbols are from a plurality of consecutive slots, the plurality of consecutive slots differ in type and/or composition, and different quantities of symbols are selected from all the slots, but messages transmitted in the selected symbols have same content. This helps a transmit party perform average segmentation based on a quantity of slots during data segmentation, and also helps a receive party combine data, to avoid a confusion in amounts of data allocated to the symbols in a message transmission process. The transmitted messages in all slots have the same content, but the different quantities of symbols are selected. Therefore, during transmission, different types of rate matching or different spreading factors may be used or different formats and parameters may be used in all the symbols, to ensure that data transmission can meet a bit error rate/block error rate requirement.

That the transmitted messages have the same content may be that transmitted data is completely the same; or may be that the transmitted messages have a same quantity of bits, or that the transmitted messages are of a same type, for example, all are channel quality indicators (CQI), or that the transmitted messages are in a same format (for example, all are in a PUCCH format 1, or all are short PUCCHs, or all are long PUCCHs).

Figure 5A:
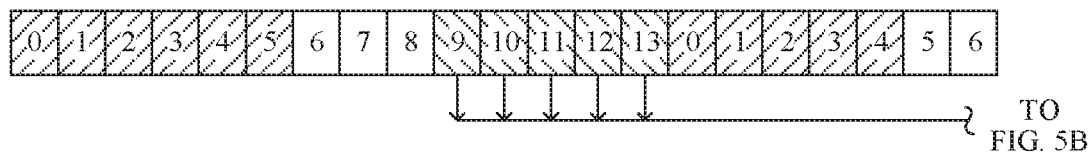
FIG. 5A and FIG. 5B are example diagrams of another implementation of slot aggregation according to this application.
Figure 5B:
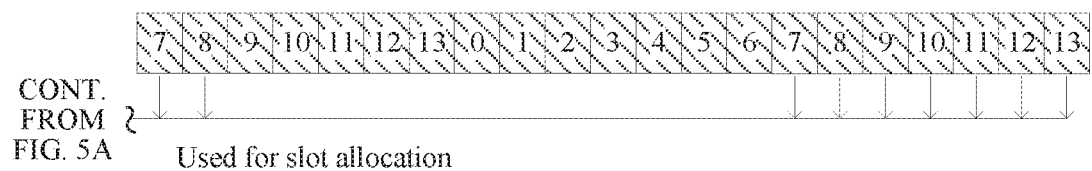

For example, the terminal performs uplink transmission, and the base station selects different quantities of uplink symbols from consecutive slots. As shown in FIG. 5, one slot is composed by 14 symbols, and slots differ in composition. Five uplink symbols are selected from the 1st slot, two uplink symbols are selected from the 2nd slot, and the last seven uplink symbols are selected from the 3rd slot; and the 14 selected uplink symbols are determined as the time domain resources to be allocated to the terminal. A message transmitted in the five uplink symbols selected from the 1st slot, a message transmitted in the two uplink symbols selected from the 2nd slot, and a message transmitted in the seven uplink symbols selected from the 3rd slot have same content. When uplink symbols are selected from each slot, the uplink symbols may be selected forward starting from the first uplink symbol, or may be selected backward starting from the last uplink symbol.

Figure 6A:
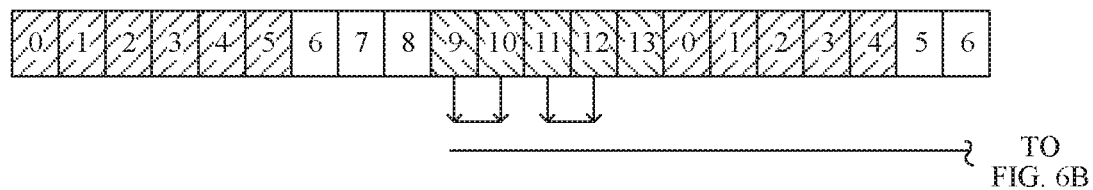
FIG. 6A and FIG. 6B are example diagrams of still another implementation of slot aggregation according to this application.
Figure 6B:
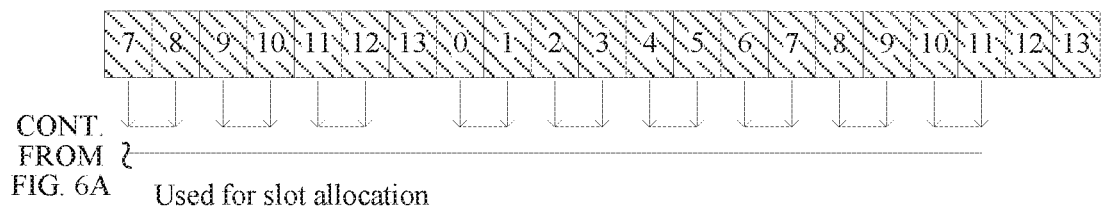

In still another implementation, the symbol group is used as a granularity. The symbol group is a combination of a preset quantity of consecutive symbols in a slot, and messages transmitted in all symbols in one symbol group have a same format and parameter. A selection process of the symbol group is the same as that in a case in which the granularity is the symbol, and an only difference is that the symbol is replaced with the symbol group. Therefore, details are not described. The following provides descriptions by using an example. For example, one symbol group includes two consecutive symbols, the terminal performs uplink transmission, and the base station selects different quantities of uplink symbol groups from consecutive slots. As shown in FIG. 6, one slot is composed by 14 symbols, and slots differ in composition. Two symbol groups are selected from the 1st slot, three symbol groups are selected from the 2nd slot, and six symbol groups are selected from the 3rd slot; and the 11 selected groups are determined as the time domain resources to be allocated to the terminal. The symbol group is larger than the symbol in terms of granularity, so that time domain resource allocation efficiency can be improved, but accuracy is relatively reduced.

The foregoing implementations may also be used for mini-slot aggregation. A mini slot has only a small quantity of symbols or even has only one symbol. Therefore, the mini slot may be considered as a single symbol or symbol group for aggregation.

In yet another implementation, the symbol or symbol group is used as a granularity. The symbols or symbol groups are from a plurality of inconsecutive slots; and the inconsecutive slots are of same composition or a same type, or the inconsecutive slots have a same quantity of uplink symbols or downlink symbols. Certainly, the inconsecutive slots may be of both same composition and a same type. Because the slots are inconsecutive, to reduce time domain resource allocation complexity, a same quantity of symbols or symbol groups are determined from all the slots; or different quantities of symbols or symbol groups are determined from the slots, but messages transmitted in the symbols or symbol groups determined from all the slots have same content. The inconsecutive slots are selected by the base station based on a condition such as a data amount of the message of the terminal and to-be-used slots. A quantity of required symbols may be determined based on an amount of data (from one or more transport blocks) transmitted by the terminal each time, and then M inconsecutive slots that meet a condition are found from N slots, where a quantity of symbols in the slots is greater than or equal to the quantity of required symbols.

Actually, when the symbol or symbol group is used as a granularity, and the symbols or symbol groups are from a plurality of inconsecutive slots, the inconsecutive slots may alternatively differ in composition or type. However, in this way, symbol or symbol group allocation complexity is greatly increased, and consequently time domain resource allocation efficiency may be reduced.

In the foregoing implementations in which the symbol is used as a granularity, the selected symbols may be consecutive symbols or inconsecutive symbols in the slots, and the symbols are randomly selected.

In all the foregoing implementations, the slots may be from a plurality of consecutive subframes; or may be from a plurality of inconsecutive subframes, and the inconsecutive subframes are of same composition or a same type. If a small quantity of symbols are selected, the symbols may be from one or several slots, and the one slot or several slots may belong to a same subframe. For example, the symbols are from two slots, and the two slots may belong to a same subframe.

It should be noted that in the data transmission method provided in this embodiment of this application, a type of the slot may be notified by the base station to the terminal in advance by using semi-static signaling, to make the terminal know composition and the type of the slot.

After determining the plurality of time domain resources to be allocated to the terminal, the base station sends the control signaling to the terminal, where the control signaling includes the information about the time domain resources. After receiving the control signaling, the terminal decodes the control signaling to determine the plurality of time domain resources used to transmit the message.

In an implementation, the base station may send only one piece of control signaling, and correspondingly, the terminal receives the one piece of control signaling from the base station, where the one piece of control signaling includes the information about the plurality of time domain resources used to transmit the message. Alternatively, in another implementation, the base station sends a plurality of pieces of control signaling, and correspondingly, the terminal receives the plurality of pieces of control signaling from the base station, where each of the plurality of pieces of control signaling includes information about one time domain resource used to transmit the message.

In addition to the information about the time domain resources, the control signaling sent by the base station may further include at least one type of the following information: a plurality of frequency domain resources used to transmit the message; slot composition or slot types of the time domain resources; time division duplex (TDD) configurations of the time domain resources; a transmission format of the message; a modulation scheme and/or a coding format of the message; power control information of the message; a hybrid automatic repeat request (HARQ) process number of the message; a reference signal of the message; antenna information of the message; beam information of the message; station information of the message; or a redundancy version of the message. Messages transmitted in different time domain resources may differ in the corresponding information, and may differ in one type of the corresponding information or may differ in a plurality of types of the corresponding information. In this way, a time domain resource can be more flexibly configured. For example, in a case of strong fading, modulation may be performed by using different configurations of a modulation scheme.

Step S303: Transmit the message in the time domain resources.

After decoding the control signaling to determine the time domain resources used to transmit the message, the terminal transmits the message in the time domain resources. Specifically, the message may belong to one transport block, and the transport block is transmitted in the time domain resources; or the message belongs to M transport blocks, and each transport block is transmitted in one time domain resource, where M is a quantity of time domain resources, and M>1. In this manner, transmission efficiency is higher. If the data amount of the message is less than or equal to a minimum capacity of the time domain resource, the message may be transmitted in each time domain resource, where the message is repeatedly transmitted for M times, and M is a quantity of time domain resources. In this manner, message transmission reliability and accuracy can be improved.

If priorities are set for messages or messages have different latencies, the terminal may determine locations, of time domain resources for transmitting the messages, in a time sequence based on the priorities or latencies of the messages, and then transmits the messages in the time domain resources corresponding to the locations. For example, a message with a highest priority or a shortest latency is transmitted in a time domain resource at an earliest location in the time sequence. For another example, a message with a second highest priority or a second shortest latency is transmitted in a time domain resource at a second earliest location in the time sequence. The rest can be deduced from this. This can ensure that a message with a high priority or a short latency is first transmitted, thereby ensuring message integrity.

According to the data transmission method provided in this embodiment of this application, a slot aggregation technology is used, so that the symbol or symbol group may be used as a granularity to select a plurality of symbols or symbol groups from one or more slots and then allocate the plurality of symbols or symbol groups to a same terminal for transmitting data. The plurality of symbols or symbol groups may be used for uplink data scheduling, or may be used for downlink data scheduling, or may be allocated to the same terminal for transmitting uplink control information (UCI). The slot aggregation may implement slot resource allocation at a small granularity, so that a time domain resource is more flexibly allocated, and a slot resource is more fully utilized. This can reduce downlink control signaling overheads and improve message transmission efficiency, thereby expanding a coverage area.

Figure 7:
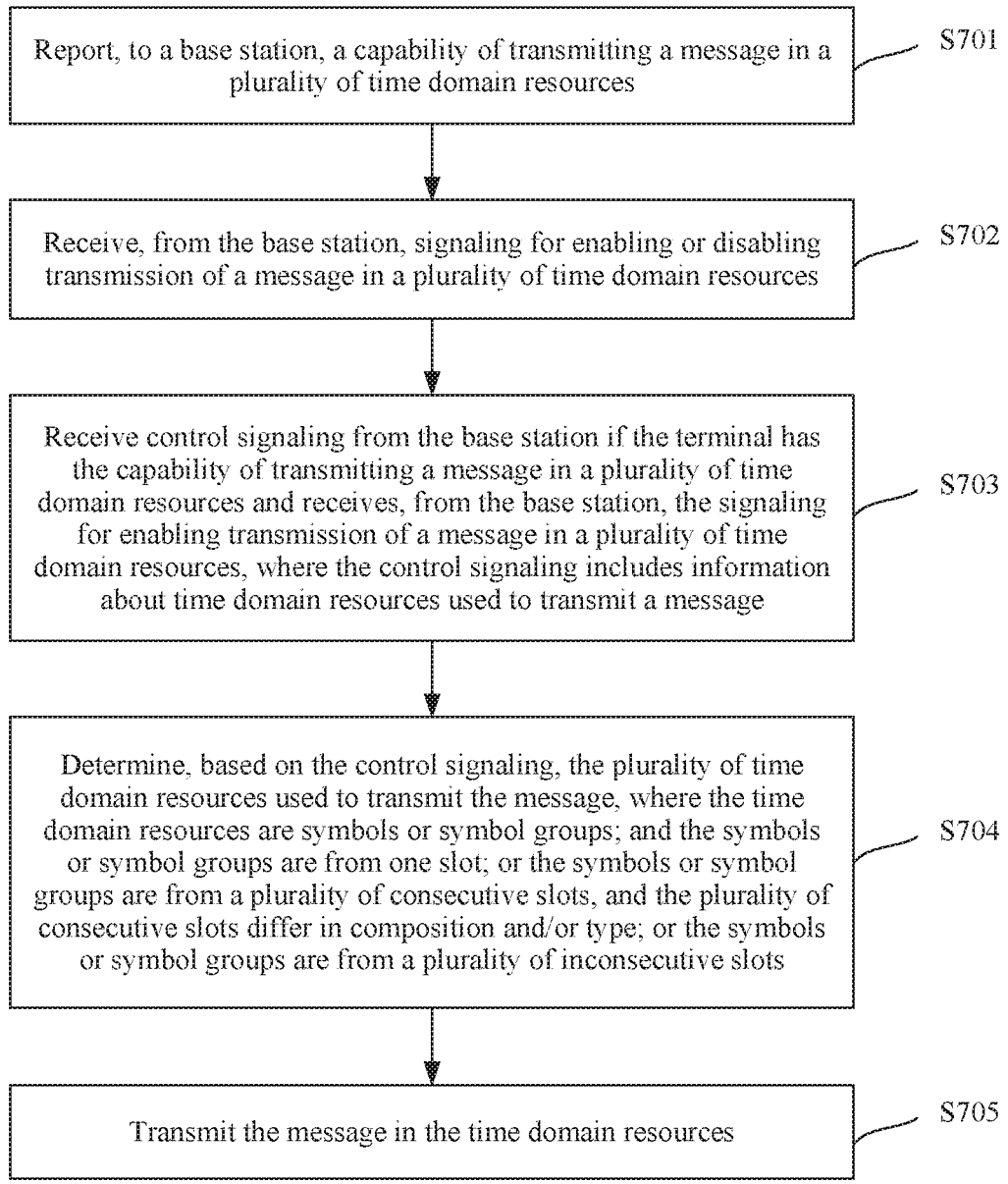
FIG. 7 is a schematic flowchart of another embodiment of a message transmission method applied to a terminal according to this application.

FIG. 7 is a schematic flowchart of another embodiment of a message transmission method according to the embodiments of this application. The method is applied to a terminal. The method includes the following steps.

Step S701: Report, to a base station, a capability of transmitting a message in a plurality of time domain resources.

S702: Receive, from the base station, signaling for enabling or disabling transmission of a message in a plurality of time domain resources.

Before transmitting a message, specifically, before receiving control signaling from the base station, the terminal may report, to the base station, the capability of the terminal in transmitting a message in a plurality of time domain resources. If the terminal does not have the capability, the base station does not send, to the terminal, the control signaling that includes information about time domain resources. If the terminal has the capability, the base station may directly send the control signaling to the terminal; or after receiving the capability reported by the terminal and learning that the terminal has the capability, the base station further sends, to the terminal, the signaling for enabling transmission of a message in a plurality of time domain resources, and then sends the control signaling that includes information about time domain resources; and after receiving the control signaling, the terminal performs step S703. If the base station receives the capability reported by the terminal and learns that the terminal has the capability, but current time domain resources are not enough for allocation or there is another limitation reason, the base station sends, to the terminal, the signaling for disabling transmission of a message in a plurality of time domain resources, and the base station neither allocates time domain resources to the terminal, nor sends, to the terminal, the control signaling that includes information about the time domain resources; and the terminal does not receive the control signaling.

Actually, one of step S701 and step S702 may be removed. For example, only S701 is reserved. In this way, provided that the terminal has the capability of transmitting a message in a plurality of time domain resources, the base station allocates the time domain resources to the terminal, and sends, to the terminal, the control signaling that includes the information about the time domain resources; and the terminal receives the control signaling. Alternatively, only step S702 may be reserved. In this way, the base station considers, by default, that the terminal has the capability of transmitting a message in a plurality of time domain resources, and when there are sufficient time domain resources, the base station sends, to the terminal, the signaling for enabling transmission of a message in a plurality of time domain resources, allocates the time domain resources to the terminal, and sends the control signaling to the terminal; and the terminal receives the control signaling. Alternatively, when there are no sufficient time domain resources, the base station sends, to the terminal, the signaling for disabling transmission of a message in a plurality of time domain resources, and does not allocate the time domain resources to the terminal.

The terminal reports, to the base station, the capability of transmitting a message in a plurality of time domain resources, so that the base station can predetermine whether to allocate the time domain resources, to avoid an unnecessary time domain resource allocation process. The base station may send, to the terminal based on a condition such as a time domain resource transmission capability of the terminal or whether there are sufficient time domain resources, the signaling for enabling or disabling transmission of a message in a plurality of time domain resources, to flexibly control message transmission of the terminal, thereby reducing time domain resource allocation consumption and avoiding a transmission error.

Step S703: Receive control signaling from the base station if the terminal has the capability of transmitting a message in a plurality of time domain resources and receives, from the base station, the signaling for enabling transmission of a message in a plurality of time domain resources, where the control signaling includes information about time domain resources used to transmit a message.

If only one of step S701 and step S702 is reserved, when step S701 is reserved, step S703 is: receive control signaling from the base station if the terminal has the capability of transmitting a message in a plurality of time domain resources, where the control signaling includes information about time domain resources used to transmit a message; or if only step S702 is reserved, step S703 is: receive control signaling from the base station if the signaling for enabling transmission of a message in a plurality of time domain resources is received from the base station, where the control signaling includes information about time domain resources used to transmit a message.

Step S704: Determine, based on the control signaling, the plurality of time domain resources used to transmit the message, where the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots.

Step S705: Transmit the message in the time domain resources.

Figure 8:
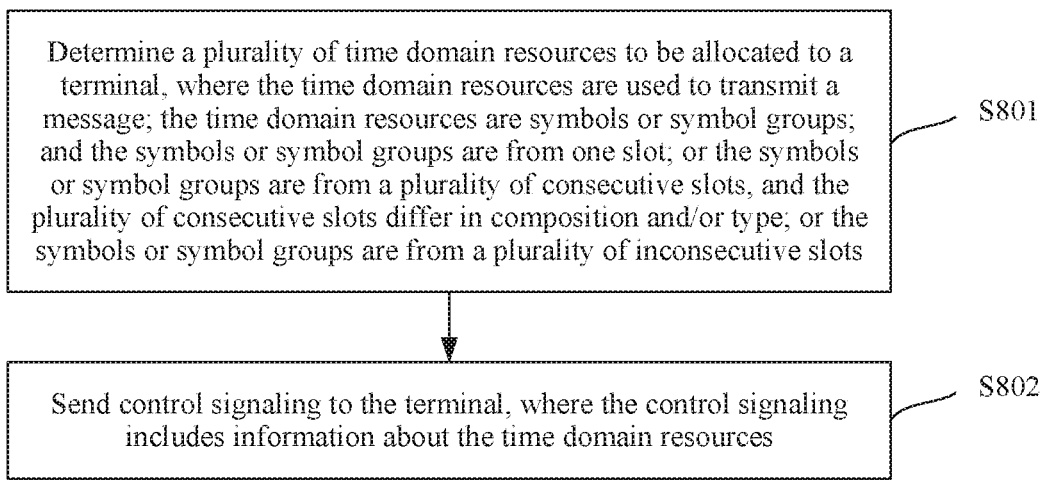
FIG. 8 is a schematic flowchart of an embodiment of a message transmission method applied to a base station according to this application.

FIG. 8 is a schematic flowchart of an embodiment of a message transmission method according to the embodiments of this application. The method is applied to a base station. The method includes the following steps:

Step S801: Determine a plurality of time domain resources to be allocated to a terminal, where the time domain resources are used to transmit a message; the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots.

Step S802: Send control signaling to the terminal, where the control signaling includes information about the time domain resources.

For a process in which the base station determines, based on an uplink transmission scheduling request or a downlink service requirement of the terminal, the plurality of time domain resources to be allocated to the terminal, refer to the descriptions in the embodiment shown in FIG. 3. Therefore, details are not described again.

The base station schedules, through downlink control information (DCI) scheduling, the determined resources to be allocated to the terminal. If not all messages transmitted in all the time domain resources have same content, time domain resources for transmitting messages with different content have different parameters. One piece of DCI may be used, where most fields in the DCI are applicable to all the time domain resources, a quantity M of time domain resources is indicated in the DCI, and parameters in which the time domain resources differ are separately indicated in the DCI sequentially. Alternatively, one piece of common DCI is used, where fields in the DCI are applicable to all the time domain resources, and a quantity M of time domain resources is indicated in the DCI; and one piece of DCI is further set for each time domain resource respectively, to indicate a field that is of the time domain resource and that is different from that of another time domain resource. If messages transmitted in different time domain resources have same content, all the time domain resources share one piece of DCI, and share fields in the DCI. In addition to a field indicating a quantity M of time domain resources, other fields in the DCI are applicable to all the time domain resources.

After determining the time domain resources, the base station sends the control signaling to the terminal, where the control signaling indicates the time domain resources that can be used by the terminal to transmit the message. After receiving the control signaling, the terminal decodes the control signaling to learn of the time domain resources allocated by the base station to the terminal for transmitting the message, and transmits the message in the time domain resources. In an implementation, the base station may send only one piece of control signaling, where the one piece of control signaling includes the information about the plurality of time domain resources used to transmit the message. Alternatively, in another implementation, the base station sends a plurality of pieces of control signaling, and correspondingly, each of the plurality of pieces of control signaling includes information about one time domain resource used to transmit the message.

In addition to the information about the time domain resources, the control signaling sent by the base station further includes at least one type of the following information: a plurality of frequency domain resources used to transmit the message; slot composition or slot types of the time domain resources; TDD configurations of the time domain resources; a transmission format of the message; a modulation scheme and/or a coding format of the message; power control information of the message; a hybrid automatic repeat request HARQ process number of the message; a reference signal of the message; antenna information of the message; beam information of the message; station information of the message; or a redundancy version of the message. Messages transmitted in different time domain resources may differ in the corresponding information, and may differ in one type of the corresponding information or may differ in a plurality of types of the corresponding information. In this way, a time domain resource can be more flexibly configured.

Figure 9:
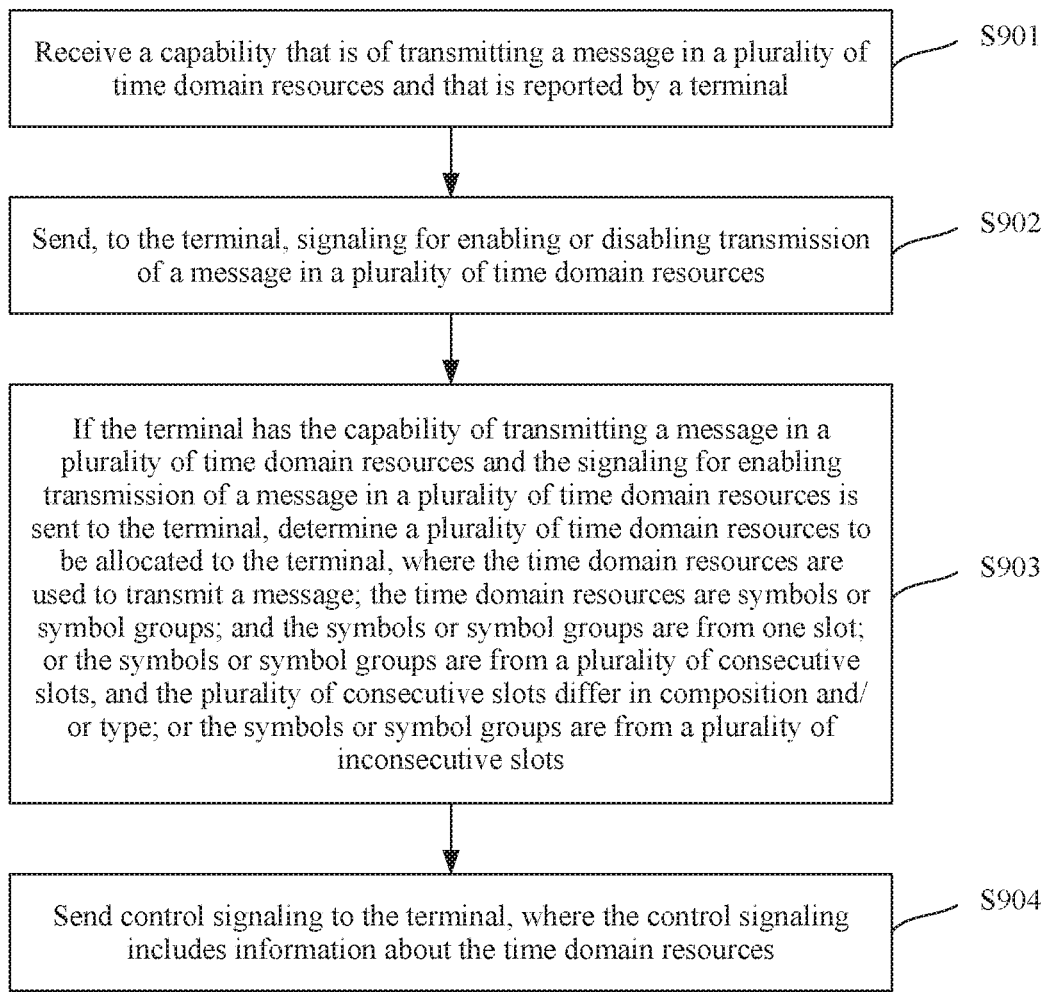
FIG. 9 is a schematic flowchart of another embodiment of a message transmission method applied to a base station according to this application.

FIG. 9 is a schematic flowchart of another embodiment of a message transmission method according to the embodiments of this application. The method is applied to a base station. The method includes the following steps.

Step S901: Receive a capability that is of transmitting a message in a plurality of time domain resources and that is reported by a terminal.

Step S902: Send, to the terminal, signaling for enabling or disabling transmission of a message in a plurality of time domain resources.

After sending an uplink transmission scheduling request to the base station or reporting a downlink service requirement to a core network, and before transmitting a message; or even before sending the uplink transmission scheduling request to the base station or reporting the downlink service requirement to the core network, the terminal may report, to the base station, the capability of the terminal in transmitting a message in a plurality of time domain resources. After receiving the capability reported by the terminal, if learning that the terminal has the capability of transmitting a message in a plurality of time domain resources, the base station may directly allocate time domain resources to the terminal, and send, to the terminal, control signaling that includes information about the time domain resources; or if learning that the terminal does not have the capability of transmitting a message in a plurality of time domain resources, the base station neither allocates time domain resources to the terminal, nor sends the control signaling to the terminal.

After receiving the capability reported by the terminal and learning that the terminal has the capability, the base station may further send, to the terminal, the signaling for enabling transmission of a message in a plurality of time domain resources, to allow the terminal to transmit a message in a plurality of time domain resources; and then, allocate the time domain resources to the terminal, and send the control signaling that includes the information about the time domain resources. After receiving the control signaling, the terminal transmits the message in the time domain resources. If the base station receives the capability reported by the terminal and learns that the terminal has the capability, but current time domain resources are not enough for allocation or there is another limitation reason, the base station may send, to the terminal, the signaling for disabling transmission of a message in a plurality of time domain resources. In this case, the terminal cannot transmit the message in the time domain resources; the base station neither allocates the time domain resources to the terminal, nor sends, to the terminal, the control signaling that includes the information about the time domain resources; and the terminal does not receive the control signaling.

In a specific implementation process, only one of step S901 and step S902 may be reserved. For example, only S901 is reserved. In this way, provided that the terminal has the capability of transmitting a message in a plurality of time domain resources, the base station allocates the time domain resources to the terminal, and sends, to the terminal, the control signaling that includes the information about the time domain resources; and the terminal receives the control signaling. Alternatively, only step S902 may be reserved. In this way, the base station considers, by default, that the terminal has the capability of transmitting a message in a plurality of time domain resources, and when there are sufficient time domain resources, the base station sends, to the terminal, the signaling for enabling transmission of a message in a plurality of time domain resources, allocates the time domain resources to the terminal, and sends the control signaling to the terminal; and the terminal receives the control signaling. Alternatively, when there are no sufficient time domain resources or there is another limitation reason, the base station sends, to the terminal, the signaling for disabling transmission of a message in a plurality of time domain resources, and does not allocate the time domain resources to the terminal.

By receiving the capability that is of transmitting a message in a plurality of time domain resources and that is reported by the terminal, the base station may predetermine whether to allocate the time domain resources. The base station may further send, to the terminal based on a condition such as a time domain resource transmission capability of the terminal or whether there are sufficient time domain resources, the signaling for enabling or disabling transmission of a message in a plurality of time domain resources, to flexibly control message transmission of the terminal, thereby avoiding an unnecessary time domain resource allocation process and avoiding a transmission error.

Step S903: If the terminal has the capability of transmitting a message in a plurality of time domain resources and the signaling for enabling transmission of a message in a plurality of time domain resources is sent to the terminal, determine a plurality of time domain resources to be allocated to the terminal, where the time domain resources are used to transmit a message; the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots.

Step S904: Send control signaling to the terminal, where the control signaling includes information about the time domain resources.

In a specific implementation process, if only step S901 is reserved, step S903 is: if the terminal has the capability of transmitting a message in a plurality of time domain resources, determine a plurality of time domain resources to be allocated to the terminal, where the time domain resources are used to transmit a message; or if step S902 is reserved, step S903 is: if the signaling for enabling transmission of a message in a plurality of time domain resources is sent to the terminal, determine a plurality of time domain resources that are used to transmit a message and that are to be allocated to the terminal.

Figure 10:
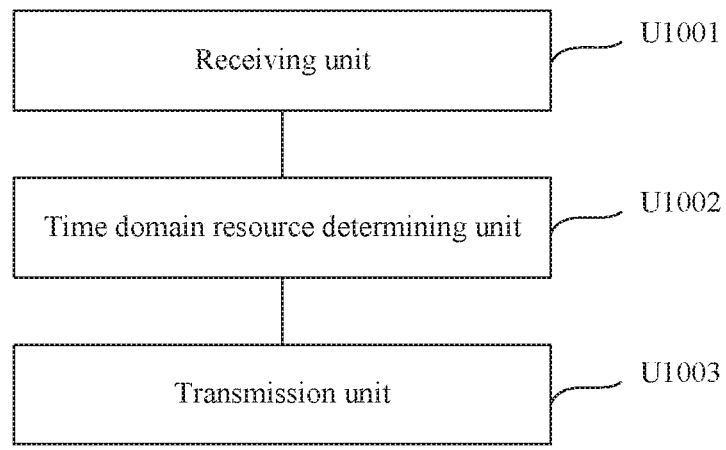
FIG. 10 is a block diagram of an embodiment of a message transmission apparatus applied to a terminal according to this application.

FIG. 10 is a block diagram of an embodiment of a message transmission apparatus according to the embodiments of this application. The apparatus is applied to a terminal and includes:

a receiving unit U1001, configured to receive control signaling from a base station, where the control signaling includes information about one or more time domain resources used to transmit a message;

a time domain resource determining unit U1002, configured to determine, based on the control signaling, the plurality of time domain resources used to transmit the message, where the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots; and a transmission unit U1003, configured to transmit the message in the time domain resources.

The receiving unit may be specifically configured to: receive one piece of control signaling from the base station, where the one piece of control signaling includes the information about the plurality of time domain resources used to transmit the message; or receive a plurality of pieces of control signaling from the base station, where each of the plurality of pieces of control signaling includes information about one time domain resource used to transmit the message. The control signaling may further include at least one type of the following information: a plurality of frequency domain resources used to transmit the message; slot composition or slot types of the time domain resources; TDD configurations of the time domain resources; a transmission format of the message; a modulation scheme and/or a coding format of the message; power control information of the message; a hybrid automatic repeat request HARQ process number of the message; a reference signal of the message; antenna information of the message; beam information of the message; station information of the message; or a redundancy version of the message. Messages transmitted in different time domain resources differ in at least one type of the corresponding information, and may differ in one type of the corresponding information, or may differ in a plurality of types of the corresponding information. A plurality of types of information of the message may be included in the control signaling based on a requirement, to help flexibly configure a time domain resource.

The time domain resource determining unit decodes the received control signaling to obtain the information about the time domain resources from the received control signaling, and determines, based on the information, the time domain resources for transmitting the message. The time domain resources may be symbols, symbol groups, slots, or subframes. This embodiment of this application mainly describes a case in which the time domain resources are symbols or symbol groups.

The symbols or symbol groups may be from a plurality of consecutive slots, a same quantity of symbols or symbol groups are determined from all the slots, and the symbols or symbol groups may be at a same absolute location or relative location in the slots in which the symbols or symbol groups are located. In this way, locations of remaining symbols are relatively determined. This helps allocate the remaining symbols, for example, helps remain end symbols for independently transmitting a Short PUCCH. Alternatively, the symbols or symbol groups may be at random locations in the slots in which the symbols or symbol groups are located, and the locations are locations in uplink symbols or downlink symbols in the slots. However, this has poor regularity, and therefore is disadvantageous to allocation of remaining symbols. Alternatively, different quantities of symbols or symbol groups are determined from the slots, but messages transmitted in the symbols or symbol groups determined from all the slots have same content. The transmitted messages have the same content, but the different quantities of symbols are selected. Therefore, during transmission, different types of rate matching or different spreading factors may be used or different formats and parameters may be used in the symbols, to ensure that data transmission can meet a bit error rate/block error rate requirement.

Alternatively, the symbols or symbol groups may be from a plurality of inconsecutive slots; the slots are of same composition or a same type, or the slots have a same quantity of uplink symbols or downlink symbols; and a same quantity of symbols or symbol groups are determined from all the slots; or different quantities of symbols or symbol groups are determined from the slots, but messages transmitted in the symbols or symbol groups determined from all the slots have same content. The slots may be of same composition and a same type, or may differ in composition and type; or the slots have different quantities of uplink symbols or downlink symbols. However, in this way, time domain resource allocation complexity of the base station is increased, and therefore efficiency of an entire transmission process is affected.

If the symbols or symbol groups are from a small quantity of slots, for example, only one or two slots, the slots may be from one subframe; or if the symbols or symbol groups are from a large number of slots, the slots may be from a plurality of subframes, and the plurality of subframes may be consecutive or may be inconsecutive. This may be determined by the base station based on a situation of to-be-used time domain resources, such as a subframe structure and subframe distribution.

If the message has a large data amount, the message may belong to one transport block, and the transmission unit transmits the transport block in the time domain resources determined by the time domain resource determining unit; or the message may belong to M transport blocks, and each transport block is transmitted in one time domain resource, where M is a quantity of time domain resources, and M>1.

If the message has a small data amount and the data amount is less than or equal to a minimum capacity of the time domain resource, the transmission unit may be specifically configured to transmit the message in each time domain resource, where the message is repeatedly transmitted for M times, and M is a quantity of time domain resources. This can improve message transmission reliability.

If priorities are set for messages or messages have different latencies, the transmission unit may determine locations, of time domain resources for transmitting the messages, in a time sequence based on the priorities or latencies of the messages, and then transmits the messages in the time domain resources corresponding to the locations. For example, a message with a highest priority or a shortest latency is transmitted in a time domain resource at an earliest location in the time sequence. The rest can be deduced from this. This can ensure that a message with a high priority or a short latency is first transmitted, thereby improving message transmission accuracy and integrity.

Figure 11:
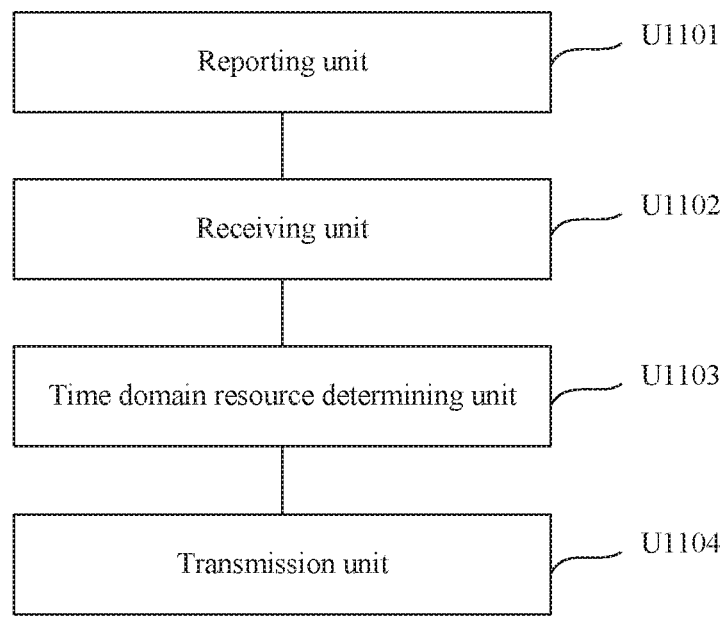
FIG. 11 is a block diagram of another embodiment of a message transmission apparatus applied to a terminal according to this application.

FIG. 11 is a block diagram of another embodiment of a message transmission apparatus according to the embodiments of this application. The apparatus is applied to a terminal and includes a reporting unit U1101, a receiving unit U1102, a time domain resource determining unit U1103, and a transmission unit U1104.

The reporting unit U1101 is configured to report, to a base station, a capability of transmitting a message in a plurality of time domain resources.

The receiving unit U1102 is configured to receive, from the base station, signaling for enabling or disabling transmission of a message in a plurality of time domain resources.

In the apparatus, the reporting unit and the foregoing function of the receiving unit may coexist; or there may be only the reporting unit, and the receiving unit does not have the foregoing function; or there may be no reporting unit, and the receiving unit has the foregoing function.

If both the foregoing function of the reporting unit and the foregoing function of the receiving unit exist, after the reporting unit reports, to the base station, the capability of transmitting a message in a plurality of time domain resources, the base station receives the capability reported by the reporting unit, and if learning that the terminal has the capability of transmitting a message in a plurality of time domain resources, the base station sends, to the terminal, the signaling for enabling transmission of a message in a plurality of time domain resources; and the receiving unit receives the signaling that is for enabling transmission of a message in a plurality of time domain resources and that is sent by the base station. If learning that the terminal does not have the capability of transmitting a message in a plurality of time domain resources, the base station sends, to the terminal, the signaling for disabling transmission of a message in a plurality of time domain resources; or if the base station learns that the terminal has the capability of transmitting a message in a plurality of time domain resources, but no sufficient time domain resources are available for allocation or there is another limitation reason, the base station also sends, to the terminal, the signaling for disabling transmission of a message in a plurality of time domain resources; and the receiving unit receives the signaling that is for disabling transmission of a message in a plurality of time domain resources and that is sent by the base station.

If there is only the reporting unit and the receiving unit does not have the function of receiving, from the base station, the signaling for enabling or disabling transmission of a message in a plurality of time domain resources, the base station receives the capability reported by the reporting unit, and if learning that the terminal has the capability of transmitting a message in a plurality of time domain resources, the base station allocates time domain resources to the terminal and sends control signaling to the terminal, where the control signaling includes information about the one or more time domain resources used to transmit a message.

If there is no reporting unit and the receiving unit has the function of receiving, from the base station, the signaling for enabling or disabling transmission of a message in a plurality of time domain resources, the base station considers, by default, that the terminal has the capability of transmitting a message in a plurality of time domain resources, and if sufficient time domain resources are available for allocation, the base station sends, to the terminal, the signaling for enabling transmission of a message in a plurality of time domain resources; and the receiving unit receives the signaling sent by the base station. If no sufficient time domain resources are available for allocation or there is another limitation reason, the base station sends, to the terminal, the signaling for disabling transmission of a message in a plurality of time domain resources; and the receiving unit receives the signaling that is for disabling transmission of a message in a plurality of time domain resources and that is sent by the base station.

The receiving unit is further configured to receive the control signaling from the base station if the terminal has the capability of transmitting a message in a plurality of time domain resources and the receiving unit receives, from the base station, the signaling for enabling transmission of a message in a plurality of time domain resources, where the control signaling includes the information about the one or more time domain resources used to transmit the message.

If there is the reporting unit and the receiving unit has the function of receiving, from the base station, the signaling for enabling or disabling transmission of a message in a plurality of time domain resources, the receiving unit receives the control signaling from the base station after the terminal has the capability of transmitting a message in a plurality of time domain resources and receives, from the base station, the signaling for enabling transmission of a message in a plurality of time domain resources. If there is only the reporting unit and the receiving unit does not have the function of receiving, from the base station, the signaling for enabling or disabling transmission of a message in a plurality of time domain resources, the receiving unit is configured to receive the control signaling from the base station if the terminal has the capability of transmitting a message in a plurality of time domain resources. If there is no reporting unit and the receiving unit has the function of receiving, from the base station, the signaling for enabling or disabling transmission of a message in a plurality of time domain resources, the receiving unit is configured to receive the control signaling from the base station if receiving, from the base station, the signaling for enabling transmission of a message in a plurality of time domain resources.

The time domain resource determining unit U1103 is configured to determine, based on the control signaling, the plurality of time domain resources used to transmit the message, where the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots.

The transmission unit U1104 is configured to transmit the message in the time domain resources.

Figure 12:
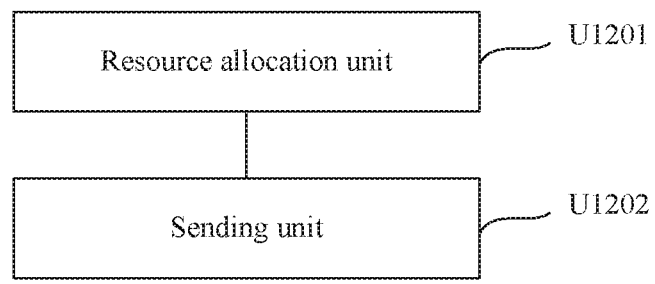
FIG. 12 is a block diagram of an embodiment of a message transmission apparatus applied to a base station according to this application.

FIG. 12 is a block diagram of an embodiment of a message transmission apparatus according to the embodiments of this application. The apparatus is applied to a base station and includes:

a resource allocation unit U1201, configured to determine a plurality of time domain resources to be allocated to a terminal, where the time domain resources are used to transmit a message; the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots; and a sending unit U1202, configured to send control signaling to the terminal, where the control signaling includes information about the time domain resources.

The resource allocation unit may use the symbol or symbol group as a granularity. The symbols or symbol groups may be from a plurality of consecutive slots, a same quantity of symbols or symbol groups are determined from all the slots, and the symbols or symbol groups may be at a same absolute location or relative location in the slots in which the symbols or symbol groups are located. Alternatively, the symbols or symbol groups may be at random locations in the slots in which the symbols or symbol groups are located, and the locations are locations in uplink symbols or downlink symbols in the slots. However, this has poor regularity, and therefore is disadvantageous to allocation of remaining symbols. Alternatively, different quantities of symbols or symbol groups are determined from the slots, but messages transmitted in the symbols or symbol groups determined from all the slots have same content. The transmitted messages have the same content, but the different quantities of symbols are selected. Therefore, during transmission, different types of rate matching or different spreading factors may be used or different formats and parameters may be used in the symbols, to ensure that data transmission can meet a bit error rate/block error rate requirement.

Alternatively, the symbols or symbol groups may be from a plurality of inconsecutive slots; the slots are of same composition or a same type, or the slots have a same quantity of uplink symbols or downlink symbols; and a same quantity of symbols or symbol groups are determined from all the slots; or different quantities of symbols or symbol groups are determined from the slots, but messages transmitted in the symbols or symbol groups determined from all the slots have same content. The slots may be of same composition and a same type, or may differ in composition and type; or the slots have different quantities of uplink symbols or downlink symbols. However, in this way, execution complexity of the resource allocation unit is increased, and therefore efficiency of an entire transmission process may be affected.

If the symbols or symbol groups are from a small quantity of slots, for example, only one or two slots, the slots may be from one subframe; or if the symbols or symbol groups are from a large quantity of slots, the slots may be from a plurality of subframes, and the plurality of subframes may be consecutive or may be inconsecutive.

The resource allocation unit may schedule, through DCI scheduling, the determined resources to be allocated to the terminal. If not all messages transmitted in all the time domain resources have same content, time domain resources for transmitting messages with different content have different parameters. One piece of DCI may be used, where most fields in the DCI are applicable to all the time domain resources, a quantity M of time domain resources is indicated in the DCI, and parameters in which the time domain resources differ are separately indicated in the DCI sequentially. Alternatively, one piece of common DCI is used, where fields in the DCI are applicable to all the time domain resources, and a quantity M of time domain resources is indicated in the DCI; and one piece of DCI is further set for each time domain resource respectively, to indicate a field that is of the time domain resource and that is different from that of another time domain resource. If messages transmitted in different time domain resources have same content, all the time domain resources share one piece of DCI, and share fields in the DCI. In addition to a field indicating a quantity M of time domain resources, other fields in the DCI are applicable to all the time domain resources.

After the resource allocation unit determines the plurality of time domain resources to be allocated to the terminal, the sending unit sends the control signaling to the terminal, where the control signaling includes the information about the plurality of time domain resources. If the plurality of time domain resources are determined by the resource allocation unit, there may be one piece of control signaling, including the information about the plurality of time domain resources; or there may be a plurality of pieces of control signaling, and each piece of control signaling includes information about one time domain resource. The sending unit sends the control signaling to the terminal, to indicate the time domain resources that can be used by the terminal. After receiving the control signaling, the terminal determines, based on the control signaling, the time domain resources for transmitting the message.

The control signaling sent by the sending unit further includes at least one type of the following information: a plurality of frequency domain resources used to transmit the message; slot composition or slot types of the time domain resources; TDD configurations of the time domain resources; a transmission format of the message; a modulation scheme and/or a coding format of the message; power control information of the message; a hybrid automatic repeat request HARQ process number of the message; a reference signal of the message; antenna information of the message; beam information of the message; station information of the message; or a redundancy version of the message. Messages transmitted in different time domain resources may differ in the corresponding information, and may differ in one type of the corresponding information or may differ in a plurality of types of the corresponding information, so that a time domain resource can be more flexibly configured.

Figure 13:
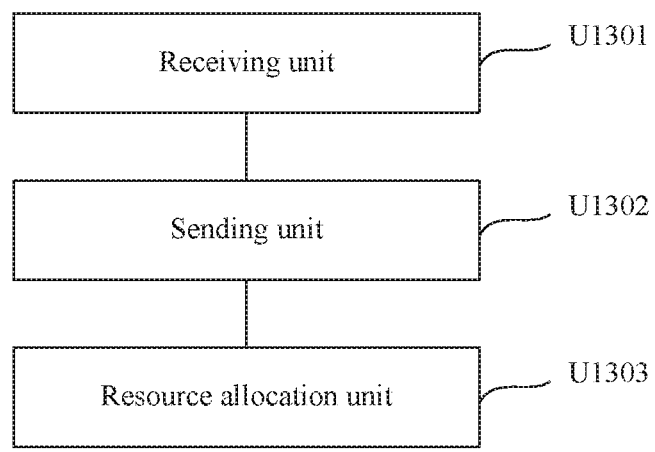
FIG. 13 is a block diagram of another embodiment of a message transmission apparatus applied to a base station according to this application.

FIG. 13 is a block diagram of another embodiment of a message transmission apparatus according to the embodiments of this application. The apparatus is applied to a base station and includes a receiving unit U1301, a sending unit U1302, and a resource allocation unit U1303.

The receiving unit U1301 is configured to receive a capability that is of transmitting a message in a plurality of time domain resources and that is reported by a terminal; and/or the sending unit U1302 is configured to send, to the terminal, signaling for enabling or disabling transmission of a message in a plurality of time domain resources.

In the apparatus, the receiving unit and the foregoing function of the sending unit may coexist; or there may be only the receiving unit, and the sending unit does not have the function of sending, to the terminal, the signaling for enabling or disabling transmission of a message in a plurality of time domain resources; or there may be no receiving unit, and the sending unit has the function of sending, to the terminal, the signaling for enabling or disabling transmission of a message in a plurality of time domain resources.

If there is the receiving unit and the sending unit has the function of sending, to the terminal, the signaling for enabling or disabling transmission of a message in a plurality of time domain resources, after the receiving unit receives the capability that is of transmitting a message in a plurality of time domain resources and that is reported by the terminal, if it is learned that the terminal has the capability of transmitting a message in a plurality of time domain resources, the sending unit sends, to the terminal, the signaling for enabling transmission of a message in a plurality of time domain resources; or if it is learned that the terminal does not have the capability of transmitting a message in a plurality of time domain resources, the sending unit sends, to the terminal, the signaling for disabling transmission of a message in a plurality of time domain resources; or if it is learned that the terminal has the capability of transmitting a message in a plurality of time domain resources, but no sufficient time domain resources are available for allocation or there is another limitation reason, the sending unit also sends, to the terminal, the signaling for disabling transmission of a message in a plurality of time domain resources.

If there is the receiving unit and the sending unit does not have the function of sending, to the terminal, the signaling for enabling or disabling transmission of a message in a plurality of time domain resources, the receiving unit receives the capability reported by the terminal; and if it is learned that the terminal has the capability of transmitting a message in a plurality of time domain resources, the resource allocation unit allocates, to the terminal, one or more time domain resources used to transmit a message, and the sending unit sends control signaling to the terminal, where the control signaling includes information about the one or more time domain resources.

If there is no receiving unit and the sending unit has the function of sending, to the terminal, the signaling for enabling or disabling transmission of a message in a plurality of time domain resources, the base station considers, by default, that the terminal has the capability of transmitting a message in a plurality of time domain resources; and if sufficient time domain resources are available for allocation, the sending unit sends, to the terminal, the signaling for enabling transmission of a message in a plurality of time domain resources; or if no sufficient time domain resources are available for allocation or there is another limitation reason, the sending unit sends, to the terminal, the signaling for disabling transmission of a message in a plurality of time domain resources.

The resource allocation unit U1303 is configured to determine the plurality of time domain resources to be allocated to the terminal, where the time domain resources are used to transmit the message; the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots.

The sending unit is further configured to send the control signaling to the terminal, where the control signaling includes the information about the time domain resources.

If there is the receiving unit and the sending unit has the function of sending, to the terminal, the signaling for enabling or disabling transmission of a message in a plurality of time domain resources, when the terminal has the capability of transmitting a message in a plurality of time domain resources and the sending unit sends, to the terminal, the signaling for enabling transmission of a message in a plurality of time domain resources, the resource allocation unit determines the one or more time domain resources to be allocated to the terminal. If there is the receiving unit and the sending unit does not have the function of sending, to the terminal, the signaling for enabling or disabling transmission of a message in a plurality of time domain resources, when the terminal has the capability of transmitting a message in a plurality of time domain resources, the resource allocation unit determines the plurality of time domain resources to be allocated to the terminal. If there is no receiving unit and the sending unit has the function of sending, to the terminal, the signaling for enabling or disabling transmission of a message in a plurality of time domain resources, when the sending unit sends, to the terminal, the signaling for enabling transmission of a message in a plurality of time domain resources, the resource allocation unit determines the one or more time domain resources to be allocated to the terminal.

Figure 14:
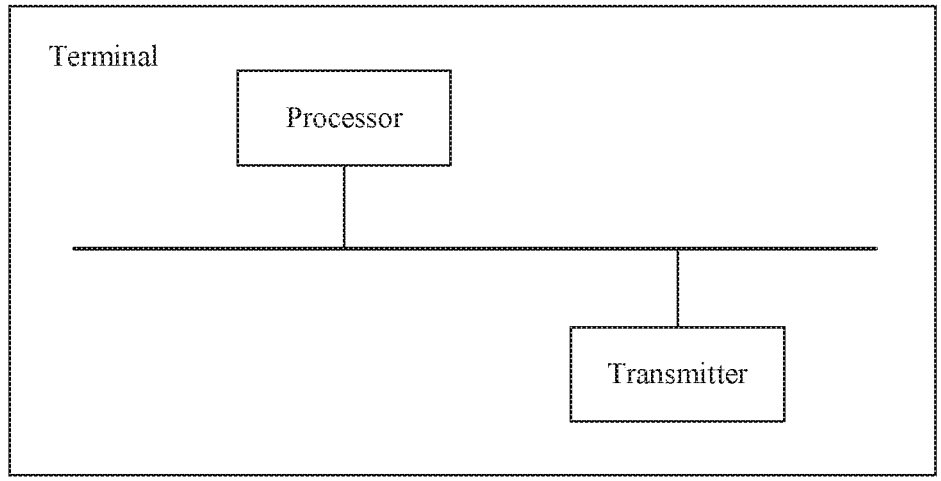
FIG. 14 is a schematic structural diagram of an embodiment of a terminal according to this application.

FIG. 14 is a schematic structural diagram of an embodiment of a terminal according to the embodiments of this application. The terminal includes:

a transmitter, configured to receive control signaling from a base station, where the control signaling includes information about one or more time domain resources used to transmit a message; and a processor, configured to determine, based on the control signaling, the plurality of time domain resources used to transmit the message, where the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots, where the transmitter is further configured to transmit the message in the time domain resources.

The transmitter may be specifically configured to: receive one piece of control signaling from the base station, where the one piece of control signaling includes the information about the plurality of time domain resources used to transmit the message; or receive a plurality of pieces of control signaling from the base station, where each of the plurality of pieces of control signaling includes information about one time domain resource used to transmit the message. The control signaling may further include at least one type of the following information: a plurality of frequency domain resources used to transmit the message; slot composition or slot types of the time domain resources; TDD configurations of the time domain resources; a transmission format of the message; a modulation scheme and/or a coding format of the message; power control information of the message; a hybrid automatic repeat request HARQ process number of the message; a reference signal of the message; antenna information of the message; beam information of the message; station information of the message; or a redundancy version of the message. Messages transmitted in different time domain resources differ in at least one type of the corresponding information, and may differ in one type of the corresponding information, or may differ in a plurality of types of the corresponding information. A plurality of types of information of the message may be included in the control signaling based on a requirement, to help flexibly configure a time domain resource.

The processor decodes the received control signaling to obtain the information about the time domain resources from the received control signaling, and determines, based on the information, the time domain resources for transmitting the message. The time domain resources may be symbols, symbol groups, slots, or subframes.

The symbols or symbol groups may be from a plurality of consecutive slots, a same quantity of symbols or symbol groups are determined from all the slots, and the symbols or symbol groups may be at a same absolute location or relative location in the slots in which the symbols or symbol groups are located. Alternatively, the symbols or symbol groups may be at random locations in the slots in which the symbols or symbol groups are located, and the locations are locations in uplink symbols or downlink symbols in the slots. Alternatively, different quantities of symbols or symbol groups are determined from the slots, but messages transmitted in the symbols or symbol groups determined from all the slots have same content. The transmitted messages have the same content, but the different quantities of symbols are selected. Therefore, during transmission, different types of rate matching or different spreading factors may be used or different formats and parameters may be used in the symbols, to ensure that data transmission can meet a bit error rate/block error rate requirement.

Alternatively, the symbols or symbol groups may be from a plurality of inconsecutive slots; the slots are of same composition or a same type, or the slots have a same quantity of uplink symbols or downlink symbols; and a same quantity of symbols or symbol groups are determined from all the slots; or different quantities of symbols or symbol groups are determined from the slots, but messages transmitted in the symbols or symbol groups determined from all the slots have same content. The slots may be of same composition and a same type, or may differ in composition and type; or the slots have different quantities of uplink symbols or downlink symbols. However, in this way, time domain resource processing complexity of the processor is increased, a large resource is occupied, and processing efficiency is reduced.

If the symbols or symbol groups are from a small quantity of slots, for example, only one or two slots, the slots may be from one subframe; or if the symbols or symbol groups are from a large quantity of slots, the slots may be from a plurality of subframes, and the plurality of subframes may be consecutive or may be inconsecutive.

If the message has a large data amount, the message may belong to one transport block, and the transmitter transmits the transport block in the determined time domain resources; or the message may belong to M transport blocks, and the transmitter transmits each transport block in one time domain resource, where M is a quantity of time domain resources, and M>1. If the message has a small data amount and the data amount is less than or equal to a minimum capacity of the time domain resource, the transmitter may be specifically configured to transmit the message in each time domain resource, where the message is repeatedly transmitted for M times, and M is a quantity of time domain resources. This can improve message transmission reliability.

If priorities are set for messages or messages have different latencies, the transmitter may determine locations, of time domain resources for transmitting the messages, in a time sequence based on the priorities or latencies of the messages, and then transmits the messages in the time domain resources corresponding to the locations. For example, a message with a highest priority or a shortest latency is transmitted in a time domain resource at an earliest location in the time sequence. The rest can be deduced from this. This can ensure that a message with a high priority or a short latency is first transmitted, thereby improving message transmission security and integrity.

In another implementation, the terminal may include:

a transmitter, configured to report, to a base station, a capability of transmitting a message in a plurality of time domain resources, where the transmitter is further configured to receive, from the base station, signaling for enabling or disabling transmission of a message in a plurality of time domain resources; and a processor, configured to determine, based on the control signaling, a plurality of time domain resources used to transmit the message, where the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots, where the transmitter is further configured to transmit the message in the time domain resources.

The transmitter may have both the function of reporting, to the base station, the capability of transmitting a message in a plurality of time domain resources and the function of receiving, from the base station, the signaling for enabling or disabling transmission of a message in a plurality of time domain resources; or may have the function of reporting, to the base station, the capability of transmitting a message in a plurality of time domain resources, but not have the function of receiving, from the base station, the signaling for enabling or disabling transmission of a message in a plurality of time domain resources; or may not have the function of reporting, to the base station, the capability of transmitting a message in a plurality of time domain resources, but have the function of receiving, from the base station, the signaling for enabling or disabling transmission of a message in a plurality of time domain resources.

If the transmitter has both the function of reporting, to the base station, the capability of transmitting a message in a plurality of time domain resources and the function of receiving, from the base station, the signaling for enabling or disabling transmission of a message in a plurality of time domain resources, after the transmitter reports, to the base station, the capability of transmitting a message in a plurality of time domain resources, the base station receives the capability reported by the terminal, and if learning that the terminal has the capability of transmitting a message in a plurality of time domain resources, the base station sends, to the terminal, the signaling for enabling transmission of a message in a plurality of time domain resources; and the transmitter receives the signaling that is for enabling transmission of a message in a plurality of time domain resources and that is sent by the base station. If learning that the terminal does not have the capability of transmitting a message in a plurality of time domain resources, the base station sends, to the terminal, the signaling for disabling transmission of a message in a plurality of time domain resources; or if the base station learns that the terminal has the capability of transmitting a message in a plurality of time domain resources, but no sufficient time domain resources are available for allocation or there is another limitation reason, the base station also sends, to the terminal, the signaling for disabling transmission of a message in a plurality of time domain resources; and the transmitter receives the signaling that is for disabling transmission of a message in a plurality of time domain resources and that is sent by the base station.

If the transmitter has the function of reporting, to the base station, the capability of transmitting a message in a plurality of time domain resources, but does not have the function of receiving, from the base station, the signaling for enabling or disabling transmission of a message in a plurality of time domain resources, the base station receives the capability reported by the transmitter, and if learning that the terminal has the capability of transmitting a message in a plurality of time domain resources, the base station allocates the time domain resources to the terminal and sends the control signaling to the terminal, where the control signaling includes information about the plurality of time domain resources used to transmit the message; and the transmitter receives the control signaling sent by the base station.

If the transmitter does not have the function of reporting, to the base station, the capability of transmitting a message in a plurality of time domain resources, but has the function of receiving, from the base station, the signaling for enabling or disabling transmission of a message in a plurality of time domain resources, the base station considers, by default, that the terminal has the capability of transmitting a message in a plurality of time domain resources, and if sufficient time domain resources are available for allocation, the base station sends, to the terminal, the signaling for enabling transmission of a message in a plurality of time domain resources; and the transmitter receives the signaling sent by the base station. If no sufficient time domain resources are available for allocation or there is another limitation reason, the base station sends, to the terminal, the signaling for disabling transmission of a message in a plurality of time domain resources; and the transmitter receives the signaling that is for disabling transmission of a message in a plurality of time domain resources and that is sent by the base station.

The transmitter is further configured to receive the control signaling from the base station if the terminal has the capability of transmitting a message in a plurality of time domain resources and receives, from the base station, the signaling for enabling transmission of a message in a plurality of time domain resources, where the control signaling includes the information about the plurality of time domain resources used to transmit the message.

If the transmitter has both the function of reporting, to the base station, the capability of transmitting a message in a plurality of time domain resources and the function of receiving, from the base station, the signaling for enabling or disabling transmission of a message in a plurality of time domain resources, the transmitter receives the control signaling from the base station after the terminal has the capability of transmitting a message in a plurality of time domain resources and the transmitter receives, from the base station, the signaling for enabling transmission of a message in a plurality of time domain resources. If the transmitter has the function of reporting, to the base station, the capability of transmitting a message in a plurality of time domain resources, but does not have the function of receiving, from the base station, the signaling for enabling or disabling transmission of a message in a plurality of time domain resources, the transmitter is configured to receive the control signaling from the base station when the terminal has the capability of transmitting a message in a plurality of time domain resources. If the transmitter does not have the function of reporting, to the base station, the capability of transmitting a message in a plurality of time domain resources, but has the function of receiving, from the base station, the signaling for enabling or disabling transmission of a message in a plurality of time domain resources, the transmitter is further configured to receive the control signaling from the base station when receiving, from the base station, the signaling for enabling transmission of a message in a plurality of time domain resources.

The transmitter is further configured to: receive, from the base station, the signaling for enabling or disabling transmission of a message in a plurality of time domain resources, and receive the control signaling from the base station, where the control signaling includes the information about the plurality of time domain resources used to transmit the message.

Figure 15:
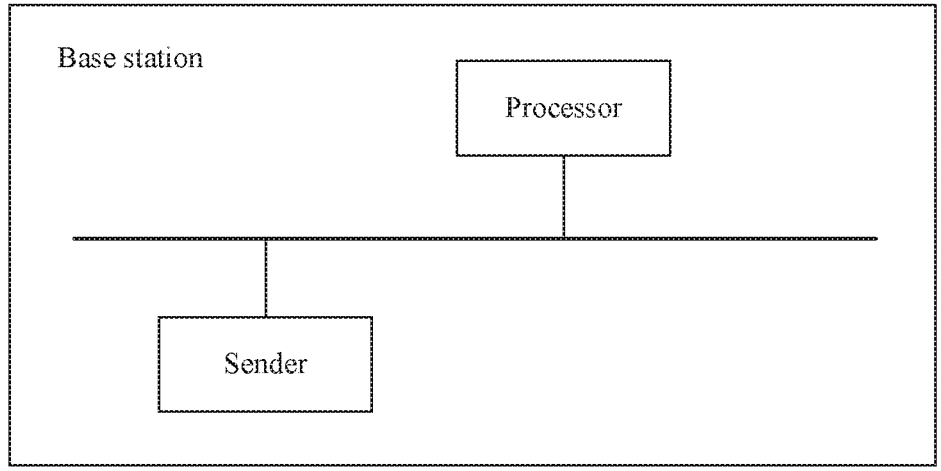
FIG. 15 is a schematic structural diagram of an embodiment of a base station according to this application.

FIG. 15 is a schematic structural diagram of an embodiment of a base station according to the embodiments of this application. The base station includes:

a processor, configured to determine a plurality of time domain resources to be allocated to a terminal, where the time domain resources are used to transmit a message; the time domain resources are symbols or symbol groups; and the symbols or symbol groups are from one slot; or the symbols or symbol groups are from a plurality of consecutive slots, and the plurality of consecutive slots differ in composition and/or type; or the symbols or symbol groups are from a plurality of inconsecutive slots; and a sender, configured to send control signaling to the terminal, where the control signaling includes information about the time domain resources.

The processor may use the symbol or symbol group as a granularity. The symbols or symbol groups may be from a plurality of consecutive slots, a same quantity of symbols or symbol groups are determined from all the slots, and the symbols or symbol groups may be at a same absolute location or relative location in the slots in which the symbols or symbol groups are located. Alternatively, the symbols or symbol groups may be at random locations in the slots in which the symbols or symbol groups are located, and the locations are locations in uplink symbols or downlink symbols in the slots. However, this has poor regularity, and therefore is disadvantageous to allocation of remaining symbols. Alternatively, different quantities of symbols or symbol groups are determined from the slots, but messages transmitted in the symbols or symbol groups determined from all the slots have same content. The transmitted messages have the same content, but the different quantities of symbols are selected. Therefore, during transmission, different types of rate matching or different spreading factors may be used or different formats and parameters may be used in the symbols, to ensure that data transmission can meet a bit error rate/block error rate requirement.

Alternatively, the symbols or symbol groups may be from a plurality of inconsecutive slots; the slots are of same composition or a same type, or the slots have a same quantity of uplink symbols or downlink symbols; and a same quantity of symbols or symbol groups are determined from all the slots; or different quantities of symbols or symbol groups are determined from the slots, but messages transmitted in the symbols or symbol groups determined from all the slots have same content. The slots may be of same composition and a same type, or may differ in composition and type; or the slots have different quantities of uplink symbols or downlink symbols. However, in this way, execution complexity of the processor is increased, processing efficiency of the processor is reduced, and the processor occupies a larger resource, and therefore efficiency of an entire transmission process may be reduced.

If the symbols or symbol groups are from a small quantity of slots, for example, only one or two slots, the slots may be from one subframe; or if the symbols or symbol groups are from a large quantity of slots, the slots may be from a plurality of subframes, and the plurality of subframes may be consecutive or may be inconsecutive.

The processor may schedule, through DCI scheduling, the determined resources to be allocated to the terminal. If not all messages transmitted in all the time domain resources have same content, time domain resources for transmitting messages with different content have different parameters. One piece of DCI may be used, where most fields in the DCI are applicable to all the time domain resources, a quantity M of time domain resources is indicated in the DCI, and parameters in which the time domain resources differ are separately indicated in the DCI sequentially. Alternatively, one piece of common DCI is used, where fields in the DCI are applicable to all the time domain resources, and a quantity M of time domain resources is indicated in the DCI; and one piece of DCI is further set for each time domain resource respectively, to indicate a field that is of the time domain resource and that is different from that of another time domain resource. If messages transmitted in different time domain resources have same content, all the time domain resources share one piece of DCI, and share fields in the DCI. In addition to a field indicating a quantity M of time domain resources, other fields in the DCI are applicable to all the time domain resources.

After the processor determines the plurality of time domain resources to be allocated to the terminal, the sender sends the control signaling to the terminal, where the control signaling includes the information about the plurality of time domain resources. If the plurality of time domain resources are determined by the processor, there may be one piece of control signaling, including the information about the plurality of time domain resources; or there may be a plurality of pieces of control signaling, and each piece of control signaling includes information about one time domain resource. The sender sends the control signaling to the terminal. After receiving the control signaling, the terminal determines, based on the control signaling, the time domain resources for transmitting the message.

The control signaling sent by the sender further includes at least one type of the following information: a plurality of frequency domain resources used to transmit the message; slot composition or slot types of the time domain resources; TDD configurations of the time domain resources; a transmission format of the message; a modulation scheme and/or a coding format of the message; power control information of the message; a hybrid automatic repeat request HARQ process number of the message; a reference signal of the message; antenna information of the message; beam information of the message; station information of the message; or a redundancy version of the message. Messages transmitted in different time domain resources may differ in the corresponding information, and may differ in one type of the corresponding information or may differ in a plurality of types of the corresponding information, so that a time domain resource can be more flexibly configured.

Figure 16:
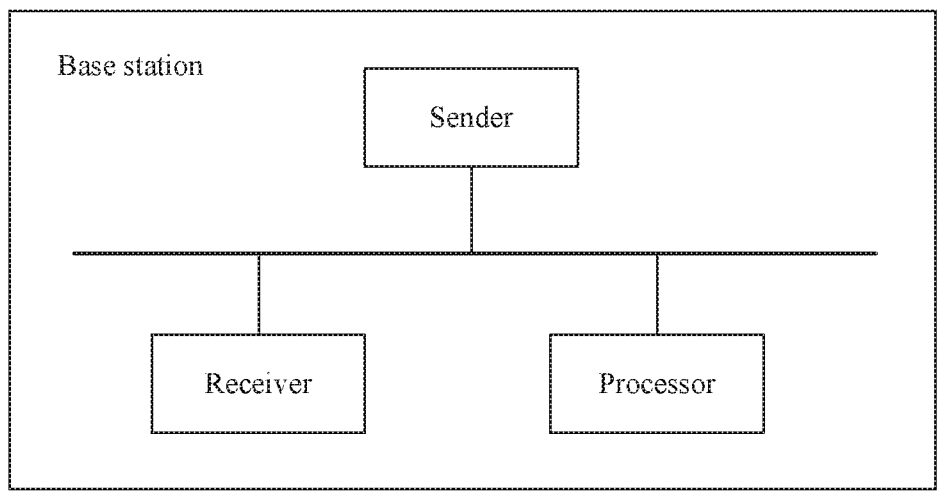
FIG. 16 is a schematic structural diagram of another embodiment of a base station according to this application.

FIG. 16 is a schematic structural diagram of another embodiment of a base station according to the embodiments of this application. The base station includes a receiver, a sender, and a processor.

The receiver is configured to receive a capability that is of transmitting a message in a plurality of time domain resources and that is reported by a terminal.

The sender is configured to send, to the terminal, signaling for enabling or disabling transmission of a message in a plurality of time domain resources.

The receiver and the foregoing function of the sender may coexist; or there may be only the receiver, and the sender does not have the function of sending, to the terminal, the signaling for enabling or disabling transmission of a message in a plurality of time domain resources; or there may be no receiver, and the sender has the function of sending, to the terminal, the signaling for enabling or disabling transmission of a message in a plurality of time domain resources. If there is the receiver and the sender has the function of sending, to the terminal, the signaling for enabling or disabling transmission of a message in a plurality of time domain resources, after the receiver receives the capability that is of transmitting a message in a plurality of time domain resources and that is reported by the terminal, if it is learned that the terminal has the capability of transmitting a message in a plurality of time domain resources, the sender sends, to the terminal, the signaling for enabling transmission of a message in a plurality of time domain resources; or if it is learned that the terminal does not have the capability of transmitting a message in a plurality of time domain resources, the sender sends, to the terminal, the signaling for disabling transmission of a message in a plurality of time domain resources; or if it is learned that the terminal has the capability of transmitting a message in a plurality of time domain resources, but no sufficient time domain resources are available for allocation or there is another limitation reason, the sender also sends, to the terminal, the signaling for disabling transmission of a message in a plurality of time domain resources.

If there is the receiver and the sender does not have the function of sending, to the terminal, the signaling for enabling or disabling transmission of a message in a plurality of time domain resources, the receiver receives the capability reported by the terminal, and if it is learned that the terminal has the capability of transmitting a message in a plurality of time domain resources, the processor allocates, to the terminal, a plurality of time domain resources used to transmit a message; and the sender sends control signaling to the terminal, where the control signaling includes information about the plurality of time domain resources.

If there is the sender and the sender does not have the function of sending, to the terminal, the signaling for enabling or disabling transmission of a message in a plurality of time domain resources, the base station considers, by default, that the terminal has the capability of transmitting a message in a plurality of time domain resources; and if sufficient time domain resources are available for allocation, the sender sends, to the terminal, the signaling for enabling transmission of a message in a plurality of time domain resources; or if no sufficient time domain resources are available for allocation or there is another limitation reason, the sender sends, to the terminal, the signaling for disabling transmission of a message in a plurality of time domain resources.

The processor is configured to determine the plurality of time domain resources to be allocated to the terminal, where the time domain resources are used to transmit the message; the time domain resources are symbols or symbol groups; and the symbols or symbol groups are from one slot or a plurality of consecutive slots, and the plurality of consecutive slots differ in composition and/or type; or the symbols or symbol groups are from a plurality of inconsecutive slots.

The sender is further configured to send the control signaling to the terminal, where the control signaling includes the information about the time domain resources.

If there is the receiver and the sender has the function of sending, to the terminal, the signaling for enabling or disabling transmission of a message in a plurality of time domain resources, when the terminal has the capability of transmitting a message in a plurality of time domain resources and the sender sends, to the terminal, the signaling for enabling transmission of a message in a plurality of time domain resources, the processor determines the plurality of time domain resources to be allocated to the terminal. If there is the receiver and the sender does not have the function of sending, to the terminal, the signaling for enabling or disabling transmission of a message in a plurality of time domain resources, when the terminal has the capability of transmitting a message in a plurality of time domain resources, the processor determines the plurality of time domain resources to be allocated to the terminal. If there is no receiver and the sender has the function of sending, to the terminal, the signaling for enabling or disabling transmission of a message in a plurality of time domain resources, when the sender sends, to the terminal, the signaling for enabling transmission of a message in a plurality of time domain resources, the processor determines the plurality of time domain resources to be allocated to the terminal.

The sender may be further configured to transmit a downlink message to the terminal.

A person skilled in the art may clearly understand that, the technologies in the embodiments of this application may be implemented by software in combination with a necessary general hardware platform. Based on such an understanding, the technical solutions in the embodiments of this application essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a base station, a terminal, a network device, or the like) to perform the methods described in the embodiments or some parts of the embodiments of this application.

For same or similar parts in the embodiments in this specification, mutually refer to these embodiments. Particularly, the apparatus, terminal, and base station embodiments are basically similar to the method embodiments, and therefore are described relatively briefly. For related parts, refer to the descriptions in the method embodiments.

What is claimed is:

1. A message transmission method, wherein the method comprises:
    receiving control signaling from a base station, wherein the control signaling comprises information about a plurality of time domain resources used to transmit a message;
    determining, based on the control signaling, the plurality of time domain resources used to transmit the message, wherein the plurality of time domain resources are a plurality of symbols, the plurality of symbols are from a plurality of inconsecutive slots, quantities of symbols determined from the plurality of inconsecutive slots are the same, and slot composition of the inconsecutive slots is the same or different, and the slot composition of the inconsecutive slots is at least one of following types: a downlink-symbol-centric slot or an uplink-symbol-centric slot; and transmitting the message in the time domain resources.

2. The method according to claim 1, wherein each of the plurality of slots comprises N symbols in the plurality of symbols, the N symbols are consecutive, and N is an integer.

3. The method according to claim 2, wherein the N symbols in each slot are at a same absolute location or relative location in the plurality of slots.

4. The method according to claim 1, wherein the message is signaling or data.

5. The method according to claim 1, wherein the transmitting the message in the time domain resources comprises:

if the message belongs to one transport block, transmitting the transport block in the time domain resources; or if the message belongs to M transport blocks, transmitting each transport block in one time domain resource, wherein M is a quantity of the time domain resources, and M>1.

6. The method according to claim 1, wherein the transmitting the message in the time domain resources comprises:

transmitting the message in each time domain resource, wherein the message is repeatedly transmitted for M times, and M is a quantity of time domain resources.

7. The method according to claim 1, further comprising:

reporting, to the base station, a capability of transmitting a message in a plurality of time domain resources.

8. The apparatus according to claim 1, the executable instructions, when executed by the at least one processor, further cause the apparatus to:

report, to the base station, a capability of transmitting a message in a plurality of time domain resources.

9. An apparatus, comprising at least one processor and a storage medium, wherein the storage medium stores executable instructions; and
the executable instructions, when executed by the at least one processor, cause the apparatus to:

receive control signaling from a base station, wherein the control signaling comprises information about a plurality of time domain resources used to transmit a message;

determine, based on the control signaling, the plurality of time domain resources used to transmit the message, wherein the plurality of time domain resources are a plurality of symbols, the plurality of symbols are from a plurality of inconsecutive slots, quantities of symbols determined from the plurality of inconsecutive slots are the same, and slot composition of the inconsecutive slots is the same or different, and the slot composition of the inconsecutive slots is at least one of following types: a downlink-symbol-centric slot or an uplink-symbol-centric slot; and transmit the message in the time domain resources.

10. The apparatus according to claim 9, wherein each of the plurality of slots comprises N symbols in the plurality of symbols, the N symbols are consecutive, and N is an integer.

11. The apparatus according to claim 10, wherein the N symbols in each slot are at a same absolute location or relative location in the plurality of slots.

12. The apparatus according to claim 9, wherein the message is signaling or data.

13. The apparatus according to claim 9, wherein the transmitting the message in the time domain resources comprises:

if the message belongs to one transport block, transmitting the transport block in the time domain resources; or if the message belongs to M transport blocks, transmitting each transport block in one time domain resource, wherein M is a quantity of the time domain resources, and M>1.

14. The apparatus according to claim 9, wherein the transmitting the message in the time domain resources comprises:

transmitting the message in each time domain resource, wherein the message is repeatedly transmitted for M times, and M is a quantity of time domain resources.

15. A non-transitory computer readable medium storing program codes for use by a terminal device for wireless communication, wherein the program codes comprise instructions for:

receiving control signaling from a base station, wherein the control signaling comprises information about a plurality of time domain resources used to transmit a message;

determining, based on the control signaling, the plurality of time domain resources used to transmit the message, wherein the plurality of time domain resources are a plurality of symbols, the plurality of symbols are from a plurality of inconsecutive slots, quantities of symbols determined from the plurality of inconsecutive slots are the same, and slot composition of the inconsecutive slots is the same or different, and the slot composition of the inconsecutive slots is at least one of following types: a downlink-symbol-centric slot or an uplink-symbol-centric slot; and transmitting the message in the time domain resources.

16. The non-transitory computer readable medium according to claim 15, wherein each of the plurality of slots comprises N symbols in the plurality of symbols, the N symbols are consecutive, and N is an integer.

17. The non-transitory computer readable medium according to claim 16, wherein the N symbols in each slot are at a same absolute location or relative location in the plurality of slots.

18. The non-transitory computer readable medium according to claim 15, wherein the transmitting the message in the time domain resources comprises:

transmitting the message in each time domain resource, wherein the message is repeatedly transmitted for M times, and M is a quantity of time domain resources.

19. The non-transitory computer readable medium according to claim 15, the program codes further comprise instructions for:

reporting, to the base station, a capability of transmitting a message in a plurality of time domain resources.

* * * * *